US012291904B2

(12) United States Patent
Schneider et al.

(10) Patent No.: US 12,291,904 B2
(45) Date of Patent: May 6, 2025

(54) MAGNETIC SAFETY GATE LATCH

(71) Applicant: Barrette Outdoor Living, Inc., Middleburg Heights, OH (US)

(72) Inventors: Christopher Michael Schneider, Linwood, NJ (US); Craig Kime, Middleburg Heights, OH (US); Antonello Nizzia, Middleburg Heights, OH (US); Christopher John Heritage, Swedesboro, NJ (US)

(73) Assignee: Barrette Outdoor Living, Inc., Middleburg Heights, OH (US)

( * ) Notice: Subject to any disclaimer, the term of this patent is extended or adjusted under 35 U.S.C. 154(b) by 63 days.

(21) Appl. No.: 18/098,839

(22) Filed: Jan. 19, 2023

(65) Prior Publication Data

US 2023/0265697 A1 Aug. 24, 2023

Related U.S. Application Data

(63) Continuation of application No. 16/855,150, filed on Apr. 22, 2020, now Pat. No. 11,585,132, which is a (Continued)

(51) Int. Cl.
*E05B 47/00* (2006.01)
*E05B 1/00* (2006.01)
(Continued)

(52) U.S. Cl.
CPC .......... *E05C 19/163* (2013.01); *E05B 1/0092* (2013.01); *E05B 47/0038* (2013.01); (Continued)

(58) Field of Classification Search
CPC ............. Y10T 292/0999; Y10T 292/10; Y10T 292/1001; Y10T 292/1002; Y10T 292/1003; Y10T 292/1005
See application file for complete search history.

(56) References Cited

U.S. PATENT DOCUMENTS 91,970 A 12/1869 Scholfield
97,934 A 12/1869 Large
(Continued)

FOREIGN PATENT DOCUMENTS

AT 178038 B * 3/1954 ........... E05B 17/183
AU 9177036 A * 11/1991 ............. E05B 53/00
(Continued)

OTHER PUBLICATIONS

D&D Technologies, "Magna Laich", Product Information, retrieved on Dec. 8, 2016 from http://www.encingandawning.com/fencing/ddgatelocking.pdf, 9 Pages.
(Continued)

*Primary Examiner* — Carlos Lugo
(74) *Attorney, Agent, or Firm* — John Maldjian, Esq.; Stevens & Lee PC

(57) ABSTRACT

A magnetic safety gate latch assembly and method of operation. The assembly includes: a pool latch tube, a user-actuated coupled to the top end of the pool latch tube; a rotatable shaft within the pool latch tube, an upper end of the shaft rigidly coupled to the lid, and a lower end of the shaft including a shaped base. The assembly further includes a magnet housing that at least partially encloses the shaped base and includes an aperture to cooperatively engage with the shaped base. The assembly further includes a bottom cover coupled to the lower end of the pool latch tube and enclosing the magnet housing, the bottom cover including an aperture facing a latch pin housing, the aperture positioned to expose a magnet. The assembly further includes a ferromagnetic latch pin and housing, and a magnetic latch pin guide slidably enclosing the latch pin.

13 Claims, 32 Drawing Sheets

Related U.S. Application Data continuation of application No. 15/715,292, filed on Sep. 26, 2017, now Pat. No. 10,662,686, which is a continuation-in-part of application No. 15/281,148, filed on Sep. 30, 2016, now Pat. No. 10,641,021.

(60) Provisional application No. 62/419,295, filed on Nov. 8, 2016.

(51) Int. Cl.
*E05B 65/00* (2006.01)
*E05C 19/16* (2006.01)

(52) U.S. Cl.
CPC ........ *E05B 47/004* (2013.01); *E05B 47/0046* (2013.01); *E05B 65/0007* (2013.01); *E05B 65/0014* (2013.01); *E05C 19/16* (2013.01); *Y10T 292/11* (2015.04)

(56) References Cited

U.S. PATENT DOCUMENTS 131,403 A 9/1872 Kissinger
134,877 A 1/1873 Finley
204,267 A 5/1878 Unger
217,863 A 7/1879 Craycraft
344,882 A 7/1886 Trippe
377,648 A 2/1888 Sinning
390,507 A 10/1888 Morton
411,955 A 10/1889 Ellis
426,765 A * 4/1890 Brunhopp ............... E05B 85/22 292/DIG. 31
466,186 A 12/1891 Rohrbach
478,556 A 7/1892 Bettmann, Jr.
487,077 A 11/1892 Rapson
550,221 A 11/1895 Euphrat
580,404 A 4/1897 Keagle
608,353 A 8/1898 Olst
638,139 A 11/1899 Postle
710,051 A 9/1902 Fullam
727,494 A 5/1903 Thompson
851,936 A 4/1907 Hendrich
854,193 A 5/1907 Betts
876,300 A 1/1908 Couret
893,072 A 7/1908 Hayes
911,175 A 2/1909 Stevenson et al.
939,174 A 11/1909 Schlapbach
942,907 A 12/1909 Huff
995,232 A 6/1911 Edgar
997,036 A 7/1911 Blackburn
1,071,058 A 8/1913 Kirkpatrick
1,172,899 A * 2/1916 Painter .................... E05B 85/22 292/DIG. 31
1,204,072 A 11/1916 Royack
1,260,469 A 3/1918 Smith
1,302,409 A 4/1919 Murphy
1,394,962 A 10/1921 Bate
1,426,445 A 8/1922 Anderson
1,447,705 A 3/1923 John
1,495,370 A 5/1924 Witten
1,570,603 A 1/1926 Holda
1,602,264 A 10/1926 Hutchison
1,671,328 A 5/1928 Joseph et al.
1,706,102 A 3/1929 David
1,768,021 A 6/1930 Bauerband
1,820,715 A 8/1931 Vance
1,958,940 A 5/1934 Cavanaugh et al.
2,074,759 A 3/1937 Richards
2,131,458 A * 9/1938 Turner ...................... E05C 1/14 292/169.21
2,183,291 A 12/1939 Haught
2,219,186 A 10/1940 Hornfeck
2,288,688 A 7/1942 William
2,370,691 A 3/1945 Schlage
2,446,336 A 8/1948 Mark et al.
2,468,969 A 5/1949 Galey
2,497,425 A 2/1950 Terry
2,514,927 A 7/1950 Bernhard
2,524,924 A 10/1950 Vincent
2,532,881 A 12/1950 Barnes
2,586,900 A 2/1952 Wayne
2,615,744 A 10/1952 Angelo
2,641,494 A 6/1953 Eugene
2,659,115 A 11/1953 Anderson et al.
2,690,349 A 9/1955 Teetor
2,719,050 A 12/1955 Teetor
2,726,891 A 12/1955 Gresham et al.
2,727,772 A 1/1956 Hamilton
2,767,007 A 10/1956 Burke
2,729,486 A 7/1957 Evans
2,797,655 A 7/1957 Morehouse
2,801,870 A 8/1957 Davey
2,803,074 A 8/1957 Brokish
2,808,281 A 10/1957 Poe
2,828,762 A 4/1958 Swank
2,852,876 A 9/1958 Louis
2,861,287 A 12/1958 Scalf
2,864,637 A 3/1959 Teague et al.
2,877,041 A 6/1960 Foley
2,942,907 A 9/1960 Nagel et al.
2,953,916 A 2/1961 Thomas
2,970,857 A 6/1961 Squire
2,988,389 A 6/1961 Wilson
3,055,204 A 9/1962 Pelcin
3,066,964 A 12/1962 Georges
3,069,193 A 12/1962 Kirk
3,174,314 A 3/1965 Grady
3,187,129 A 6/1965 McBrian
3,247,924 A 4/1966 Price
3,273,925 A 9/1966 Graham
3,282,617 A 11/1966 Wason
3,288,511 A 11/1966 Tavano
3,311,395 A 3/1967 Leonard
3,317,904 A * 5/1967 Clay ...................... H01H 27/06 340/542
3,325,202 A 6/1967 Mateja et al.
3,326,588 A 6/1967 Melville
3,334,936 A 8/1967 Maarten et al.
3,350,127 A 10/1967 Maarten
3,368,375 A 2/1968 Russell et al.
3,376,615 A 4/1968 Heckman
3,406,267 A 10/1968 Kohls
3,413,026 A 11/1968 Marron et al.
3,416,805 A 12/1968 Morrison
3,469,822 A 9/1969 O'Brien
3,503,642 A 3/1970 Poe
3,516,701 A 6/1970 Graham
3,596,958 A 8/1971 Bowerman
3,600,025 A 8/1971 Brainard
3,625,312 A 12/1971 Hutner
3,664,699 A 5/1972 Weigelt
3,790,197 A 2/1974 Parker
3,794,366 A 2/1974 Graham
3,804,440 A 4/1974 Carey
3,871,134 A 3/1975 Lening
3,872,696 A 3/1975 Geringer
3,877,738 A 4/1975 Nelson
3,888,446 A 6/1975 O'Brien
3,890,814 A 6/1975 Fantoni
3,953,064 A 4/1976 McHenry
4,005,886 A 2/1977 Lirette
4,055,360 A 10/1977 Russi
4,111,475 A 9/1978 McCormick et al.
4,118,055 A 10/1978 Bischoff, Jr.
4,122,630 A 10/1978 Parisien
4,122,631 A 10/1978 Batcheller
4,142,749 A 3/1979 Heald et al.
4,157,197 A 6/1979 Wilson
4,179,143 A 12/1979 Shy
4,210,888 A 7/1980 Holce
4,213,110 A 7/1980 Holce
4,226,450 A 10/1980 Kerr
4,249,345 A 2/1981 Littleton
4,270,781 A 6/1981 Nishimura

(56) References Cited

U.S. PATENT DOCUMENTS

| | | | |
|---|---|---|---|
| 4,305,611 A | 12/1981 | Robins | |
| 4,389,062 A | 6/1983 | Rosenberg | |
| 4,425,771 A | 1/1984 | Beach et al. | |
| 4,452,011 A | 6/1984 | Trombettas | |
| 4,465,997 A | 8/1984 | Hines | |
| 4,503,723 A | 3/1985 | Reid | |
| 4,606,145 A | 8/1986 | Trombettas | |
| 4,630,396 A | 12/1986 | Zvi et al. | |
| 4,641,867 A | 2/1987 | Geringer et al. | |
| 4,662,111 A | 5/1987 | Romberg | |
| 4,664,433 A * | 5/1987 | Solovieff | E05B 63/06 292/DIG. 60 |
| 4,681,354 A | 7/1987 | Warwick | |
| 4,686,841 A | 8/1987 | Prunbauer et al. | |
| 4,691,541 A | 9/1987 | McQuade | |
| 4,702,506 A | 10/1987 | Iimura | |
| 4,822,085 A | 4/1989 | Mehr | |
| 4,848,812 A | 7/1989 | Slaughter | |
| 4,919,463 A | 4/1990 | McQuade | |
| 4,919,464 A | 4/1990 | Richards | |
| 4,937,975 A | 7/1990 | Zilkha | |
| 5,020,834 A | 6/1991 | Zilkha | |
| 5,024,473 A | 6/1991 | McQuade | |
| 5,029,912 A | 7/1991 | Gotanda | |
| 5,052,461 A | 10/1991 | Stern | |
| 5,063,876 A | 11/1991 | Harris | |
| 5,076,623 A | 12/1991 | Richards | |
| 5,103,658 A | 4/1992 | McQuade | |
| 5,114,195 A | 5/1992 | Martin et al. | |
| 5,174,063 A | 12/1992 | Lewis et al. | |
| 5,188,405 A | 2/1993 | MacCaferri | |
| 5,192,054 A | 3/1993 | Sharp | |
| 5,217,265 A | 6/1993 | Lerner et al. | |
| 5,243,325 A | 9/1993 | Marin et al. | |
| D344,882 S | 3/1994 | Doyle et al. | |
| 5,354,036 A | 10/1994 | Brown | |
| 5,358,292 A | 10/1994 | Van et al. | |
| 5,362,116 A | 11/1994 | Doyle et al. | |
| 5,367,829 A | 11/1994 | Crossley et al. | |
| 5,367,891 A | 11/1994 | Furuyama et al. | |
| 5,394,716 A | 3/1995 | Dreyer et al. | |
| 5,396,732 A | 3/1995 | Andersen et al. | |
| 5,408,219 A | 4/1995 | Newman et al. | |
| 5,409,275 A | 4/1995 | Yoshida et al. | |
| 5,438,869 A | 8/1995 | Mueller et al. | |
| 5,469,659 A | 11/1995 | Reid et al. | |
| 5,469,805 A | 11/1995 | Gibbs | |
| 5,475,996 A | 12/1995 | Chen | |
| 5,485,733 A | 1/1996 | Hoffman | |
| 5,487,289 A | 1/1996 | Otto et al. | |
| 5,490,498 A | 2/1996 | Faithfull et al. | |
| 5,553,833 A | 9/1996 | Bohen | |
| 5,632,514 A | 5/1997 | Johnson | |
| 5,664,769 A | 9/1997 | Sadinsky et al. | |
| 5,699,642 A | 12/1997 | McDevitt | |
| 5,711,556 A | 1/1998 | Masters | |
| 5,738,389 A | 4/1998 | Marks | |
| 5,823,026 A | 10/1998 | Finke | |
| 5,829,505 A | 11/1998 | Brescia | |
| 5,836,625 A | 11/1998 | Kibble | |
| 5,850,752 A | 12/1998 | Lax | |
| 5,867,107 A | 2/1999 | Gartner | |
| 5,873,198 A | 2/1999 | Demario | |
| 5,876,073 A | 3/1999 | Geringer et al. | |
| 5,894,749 A | 4/1999 | Tomaszewski et al. | |
| 5,896,769 A | 4/1999 | Elpern et al. | |
| 5,924,242 A | 7/1999 | Macari et al. | |
| 5,934,119 A | 8/1999 | Keller | |
| 6,027,104 A | 2/2000 | Alexander et al. | |
| 6,047,577 A | 4/2000 | Klimas | |
| 6,053,546 A | 4/2000 | Frolov | |
| 6,058,747 A | 5/2000 | Doyle et al. | |
| 6,114,963 A | 9/2000 | Blake et al. | |
| 6,155,616 A | 12/2000 | Akright | |
| 6,171,313 B1 | 1/2001 | Razdolsky et al. | |
| 6,174,005 B1 | 1/2001 | Norton | |
| 6,176,042 B1 | 1/2001 | Rossman et al. | |
| 6,190,082 B1 | 2/2001 | Butterfield | |
| 6,345,583 B1 | 2/2002 | Thackston et al. | |
| 6,347,486 B1 | 2/2002 | Badillet | |
| 6,359,538 B1 | 3/2002 | Jolley et al. | |
| 6,362,116 B1 | 3/2002 | Lansford | |
| 6,398,445 B1 | 6/2002 | Matali | |
| 6,425,609 B2 | 7/2002 | Cheng | |
| 6,441,735 B1 | 8/2002 | Marko et al. | |
| 6,481,158 B1 | 11/2002 | Marks | |
| 6,485,004 B1 | 11/2002 | Licata et al. | |
| 6,499,254 B2 | 12/2002 | Rossman et al. | |
| 6,513,351 B2 | 2/2003 | Clark | |
| 6,516,568 B2 | 2/2003 | Yang | |
| 6,588,811 B1 | 7/2003 | Ferguson | |
| 6,628,006 B2 | 9/2003 | Oglesby et al. | |
| 6,630,877 B2 | 10/2003 | Manthey | |
| 6,640,398 B2 | 11/2003 | Hoffman | |
| 6,652,009 B2 | 11/2003 | Fisher et al. | |
| 6,666,435 B2 | 12/2003 | Blosfelds | |
| 6,666,482 B2 | 12/2003 | Hansen et al. | |
| 6,691,467 B2 | 2/2004 | Hincher, Sr. | |
| 6,711,857 B1 | 3/2004 | Wagnitz et al. | |
| 6,733,049 B2 | 5/2004 | Piorkowski et al. | |
| 6,765,330 B2 | 7/2004 | Baur | |
| 6,938,445 B2 | 9/2005 | Huang | |
| 7,044,511 B2 | 5/2006 | Kliefoth et al. | |
| 7,065,922 B1 | 6/2006 | Kruijf et al. | |
| 7,100,405 B2 | 9/2006 | West | |
| 7,165,792 B2 | 1/2007 | Queveau et al. | |
| 7,178,792 B2 | 2/2007 | Monahan et al. | |
| 7,201,030 B2 | 4/2007 | Timothy | |
| 7,216,517 B2 | 5/2007 | Ling et al. | |
| 7,267,378 B2 | 9/2007 | Drumm | |
| 7,318,298 B2 | 1/2008 | Marsden et al. | |
| 7,334,624 B2 | 2/2008 | Waldman et al. | |
| 7,343,763 B2 | 3/2008 | Dolev | |
| 7,355,515 B2 | 4/2008 | Lee et al. | |
| 7,357,007 B2 | 4/2008 | Lin | |
| 7,385,521 B2 | 6/2008 | Macari | |
| 7,390,035 B2 | 6/2008 | Karcz et al. | |
| 7,408,433 B1 | 8/2008 | Irwin et al. | |
| 7,472,569 B2 | 1/2009 | Talpe et al. | |
| 7,481,471 B2 | 1/2009 | Andersen et al. | |
| 7,520,542 B1 | 4/2009 | Price | |
| 7,627,985 B2 | 12/2009 | Marsden et al. | |
| 7,628,045 B2 | 12/2009 | Yu | |
| 7,703,815 B2 | 4/2010 | Berkseth et al. | |
| 7,766,399 B2 | 8/2010 | Howey | |
| D624,388 S | 9/2010 | Eland | |
| 7,823,993 B2 | 11/2010 | Ostrowski | |
| 7,832,238 B2 | 11/2010 | Misner et al. | |
| 7,847,689 B1 | 12/2010 | Woitalla et al. | |
| 7,942,458 B2 | 5/2011 | Patterson | |
| 7,954,445 B2 | 6/2011 | Satoh | |
| 7,963,575 B2 | 6/2011 | Mayo et al. | |
| 8,011,212 B2 | 9/2011 | Yu | |
| 8,079,240 B2 | 12/2011 | Brown et al. | |
| 8,127,578 B2 | 3/2012 | Karcz et al. | |
| 8,256,806 B2 | 9/2012 | Timothy | |
| 8,347,555 B2 | 1/2013 | Chen | |
| 8,365,561 B2 | 2/2013 | Chang | |
| 8,376,421 B2 | 2/2013 | Simmonds | |
| 8,393,653 B2 | 3/2013 | Clark | |
| 8,505,989 B2 | 8/2013 | Wells | |
| 8,516,665 B2 | 8/2013 | Clarke et al. | |
| 8,525,686 B2 | 9/2013 | Burdenko | |
| 8,607,502 B2 | 12/2013 | Flannery et al. | |
| 8,646,815 B2 | 2/2014 | Timothy et al. | |
| 8,686,869 B2 | 4/2014 | Sharma et al. | |
| 8,733,017 B2 | 5/2014 | Marsden et al. | |
| 8,820,803 B2 | 9/2014 | Hunt et al. | |
| 8,840,060 B2 | 9/2014 | Soulier et al. | |
| 8,887,441 B2 | 11/2014 | Lundh | |
| 8,922,370 B2 | 12/2014 | Picard et al. | |
| 8,943,187 B1 | 1/2015 | Saylor | |
| 9,033,377 B2 | 5/2015 | Day et al. | |
| 9,103,421 B2 | 8/2015 | Lobo | |

(56) References Cited

U.S. PATENT DOCUMENTS

| | | | |
|---|---|---|---|
| 9,238,926 | B2 | 1/2016 | Guerrero et al. |
| 9,279,284 | B1 | 3/2016 | Axelrod et al. |
| 9,303,435 | B2 | 4/2016 | Simmonds et al. |
| 9,347,243 | B2 | 5/2016 | Talpe |
| 9,353,550 | B1 | 5/2016 | Smith |
| 9,394,723 | B1 | 7/2016 | Roth et al. |
| 9,422,753 | B2 | 8/2016 | Ishitsuka et al. |
| 9,451,998 | B2 | 9/2016 | McBride et al. |
| 9,464,467 | B1 | 10/2016 | Flannery et al. |
| 9,493,967 | B2 | 11/2016 | Basavarajappa et al. |
| 9,523,218 | B1 | 12/2016 | McGraw et al. |
| 9,523,219 | B2 | 12/2016 | MacErnis |
| 9,587,426 | B1 | 3/2017 | Flannery et al. |
| 9,790,708 | B2 | 10/2017 | Clark et al. |
| 9,803,396 | B2 | 10/2017 | Timothy |
| 9,834,975 | B2 | 12/2017 | Pignolet et al. |
| 9,933,243 | B2 | 4/2018 | Thibault et al. |
| 10,027,503 | B2 | 7/2018 | Patrick et al. |
| 10,053,889 | B1 | 8/2018 | Maratos |
| 10,072,442 | B2 | 9/2018 | Smith et al. |
| 10,082,544 | B2 | 9/2018 | Smith et al. |
| 10,091,970 | B1 | 10/2018 | Flannery et al. |
| 10,101,940 | B1 | 10/2018 | Trachtman |
| 10,109,140 | B1 | 10/2018 | Spencer |
| 10,415,290 | B1 | 9/2019 | Flannery et al. |
| 10,435,917 | B2 | 10/2019 | Nunez et al. |
| 10,443,266 | B2 | 10/2019 | Johnson et al. |
| 10,458,152 | B2 | 10/2019 | Schort et al. |
| 10,488,464 | B2 | 11/2019 | Boury |
| 10,590,680 | B2 | 3/2020 | Mizner et al. |
| 10,598,741 | B2 | 3/2020 | Smith et al. |
| 10,641,021 | B2 | 5/2020 | Schneider et al. |
| 10,662,686 | B2 | 5/2020 | Schneider et al. |
| 2002/0008388 | A1 | 1/2002 | Gleason et al. |
| 2002/0196123 | A1 | 12/2002 | Diehl et al. |
| 2003/0041632 | A1 | 3/2003 | Nin |
| 2004/0100254 | A1 | 5/2004 | Viitanen |
| 2004/0222645 | A1 | 11/2004 | Pirone et al. |
| 2005/0134056 | A1 | 6/2005 | Dionysian et al. |
| 2005/0210938 | A1 | 9/2005 | Doyle et al. |
| 2005/0262902 | A1 | 12/2005 | Ling et al. |
| 2006/0192396 | A1 | 8/2006 | Frolov et al. |
| 2006/0231821 | A1 | 10/2006 | Gavin |
| 2006/0267352 | A1 | 11/2006 | Childress |
| 2007/0007775 | A1 | 1/2007 | Gallas et al. |
| 2007/0024442 | A1 | 2/2007 | Jolley et al. |
| 2007/0113607 | A1 | 5/2007 | Huang |
| 2007/0175249 | A1 | 8/2007 | Karcz et al. |
| 2007/0194578 | A1 | 8/2007 | Boosey et al. |
| 2007/0200360 | A1 | 8/2007 | Cavallucci et al. |
| 2010/0031714 | A1 | 2/2010 | Brown et al. |
| 2010/0032966 | A1 | 2/2010 | Taglianetti |
| 2011/0016938 | A1 | 1/2011 | Chi |
| 2011/0148126 | A1 | 6/2011 | Macernis |
| 2011/0225890 | A1 | 9/2011 | Greenwood et al. |
| 2012/0255234 | A1 | 10/2012 | Wang |
| 2012/0299314 | A1 | 11/2012 | Jiang |
| 2013/0199094 | A1 | 8/2013 | Lachance et al. |
| 2013/0249221 | A1 | 9/2013 | Arssinous et al. |
| 2014/0035302 | A1 | 2/2014 | Koch et al. |
| 2014/0054904 | A1 | 2/2014 | Andrews et al. |
| 2014/0159383 | A1 | 6/2014 | Sharma et al. |
| 2014/0319850 | A1 | 10/2014 | Berger et al. |
| 2015/0015002 | A1 | 1/2015 | Macernis |
| 2016/0002955 | A1 | 1/2016 | Smith et al. |
| 2016/0060924 | A1 | 3/2016 | Singh et al. |
| 2018/0313111 | A1 | 11/2018 | Park |
| 2018/0371796 | A1 | 12/2018 | Talpe |

FOREIGN PATENT DOCUMENTS

| | | | | | |
|---|---|---|---|---|---|
| AU | 2005200184 | B1 | | 4/2005 | |
| AU | 2007100682 | A4 | | 8/2007 | |
| CA | 2504115 | A1 | | 10/2005 | |
| CN | 201193417 | Y | | 2/2009 | |
| CN | 202100152 | U | | 1/2012 | |
| DE | 10128866 | A1 | * | 12/2002 | ........... E05B 17/183 |
| DE | 102006048371 | A1 | * | 4/2008 | ............... E05B 7/00 |
| DE | 102008055794 | A1 | | 5/2010 | |
| DE | 102011116067 | A1 | | 1/2013 | |
| EP | 1657383 | A1 | | 5/2006 | |
| EP | 2913472 | A1 | | 9/2015 | |
| FR | 2836946 | A1 | | 9/2003 | |
| FR | 2861124 | A1 | | 4/2005 | |
| FR | 2861126 | A1 | | 4/2005 | |
| FR | 2871509 | A1 | | 12/2005 | |
| FR | 2920133 | A1 | | 2/2009 | |
| FR | 3002268 | A1 | | 8/2014 | |
| FR | 3002269 | A1 | | 8/2014 | |
| GB | 337575 | A | | 11/1930 | |
| GB | 591887 | A | * | 9/1947 | ............. E05B 53/00 |
| GB | 2003543 | B | | 3/1982 | |
| WO | 1992003631 | A1 | | 3/1992 | |
| WO | 2001009476 | A1 | | 2/2001 | |
| WO | 2003067004 | A1 | | 8/2003 | |
| WO | 2007070977 | A1 | | 6/2007 | |
| WO | 2008111107 | A2 | | 9/2008 | |
| WO | 2009030002 | A1 | | 3/2009 | |
| WO | 2010007078 | A1 | | 1/2010 | |
| WO | 2011088496 | A1 | | 7/2011 | |
| WO | 2014127398 | | | 8/2014 | |
| WO | 2014127399 | A1 | | 8/2014 | |
| WO | 2014127413 | A1 | | 8/2014 | |

OTHER PUBLICATIONS

Safetech Hardware LLC, "World's Safest Pool Gate Laich—Trilalch", SL-50-TRI, Product Information, retrieved on Dec. 8, 2016 from http://www.safetechhardware.com/category-safest-pool-lalch.html, 2 Pages.

Hoover Fence Company, "The Protector™ Jr. Magnetic Gate Laich", Online Fence Resource, 1976, retrieved on Dec. 8, 2016 from http://www.hooverfence.com/catalog/hardware/protectorjr.htm, 1 Page.

* cited by examiner

100

AT CLOSED POSITION, END OF MAGNET IS FACING TOWARD STEEL LATCH PIN, ATTRACTING IT INTO LATCH GROOVE

DETAIL L
CLOSED
POSITION

TOP LID IS LIFTED TO ACTIVATE,
SPINS MAGNET AND
PIN DISENGAGES

DETAIL M, OPEN

SECTION N-N

700

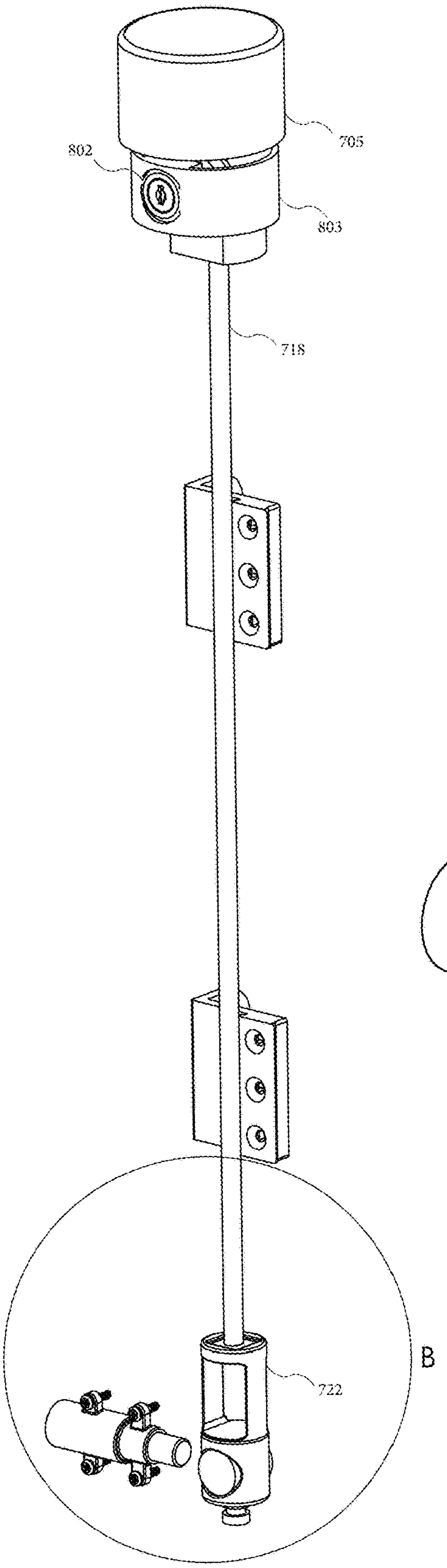
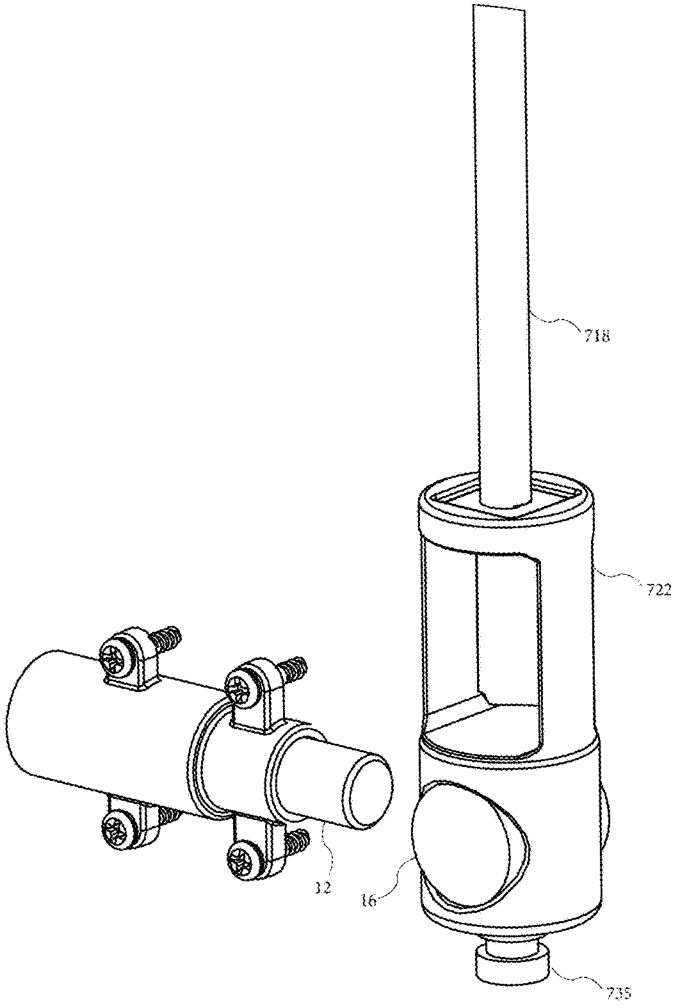
FIG. 8B
FIG. 8A
800

C

D

DETAIL A

DETAIL B

DETAIL D

DETAIL F

DETAIL G

SECTION N-N

SECTION O-O

MAGNETIC SAFETY GATE LATCH

CROSS-REFERENCE TO RELATED APPLICATIONS

This application is a continuation of U.S. patent application Ser. No. 16/855,150, filed on Apr. 22, 2020; which is a continuation of U.S. patent application Ser. No. 15/715,292, filed on Sep. 26, 2017; now U.S. Pat. No. 10,662,686; which is a continuation in part of U.S. patent application Ser. No. 15/281,148, filed on Sep. 30, 2016; now U.S. Pat. No. 10,641,021. This application also claims the benefit of U.S. Provisional Patent Application Ser. No. 62/419,295, filed Nov. 8, 2016. The entire contents of each of the foregoing applications is hereby incorporated by reference in their respective entirety.

BACKGROUND

Fences and fence gates typically are installed in outdoor areas, such as lawns, yards, gardens outdoor decks, and so forth. A fence or a fence gate includes one or more posts fixed to the ground, an upright coupled to each post, and rails coupled to the upright.

Fences are often installed around swimming pools in order to control physical access to the pool. In particular, a goal of the fence is to prevent young children from entering a pool area without adult supervision, because of a risk of drowning. Similarly, the fence may be used to prevent children, who have been allowed to be in the pool area, from leaving the pool area without adult supervision. Such fences may also be mandated by local ordinances around a swimming pool. Usage of a fence in this way is not limited to swimming pools, but also may be used around substantially any attractive nuisance that could be dangerous if not properly supervised.

The fence will include a gate to allow persons to enter and to exit the pool area. A conventional latch or doorknob to keep the gate closed suffers drawbacks such as being reachable by small children or, in the case of a latch, may be prone to not being closed securely. The gate should be operable by adults but not by children. Furthermore, it is not unusual for adults using a swimming pool to leave and reenter several times, e.g., to get drinks or food, check on something within a house, and so forth. Such persons often do not carry keys.

Thus, there is a need for a gate latch and a way to operate the gate latch that is simple for adults, yet is difficult or impossible for young children to operate.

SUMMARY

Embodiments of the invention generally are directed to a latching apparatus and method for a fence gate. In particular, embodiments provide a magnetically-operated gate latch for use in a gated fence surrounding a swimming pool or other area where access needs to be controlled.

Embodiments in accordance with the present disclosure include a magnetic safety gate latch assembly including a first subassembly and a second subassembly. The first subassembly includes: a vertically-oriented pool latch tube; a lift mechanism coupled to the top end of the pool latch tube; a shaft vertically oriented within the pool latch tube, coupled to the lift mechanism, and having a lower end including a helical thread; a magnet and magnet housing, the magnet housing coupled to the helical threading of the shaft; and a bottom cover coupled to the lower end of the pool latch tube and enclosing the magnet housing, the bottom cover including an aperture on a vertical side facing a latch pin housing, the aperture positioned to expose the magnet. The second subassembly includes the latch pin housing; a ferromagnetic latch pin; and a magnetic latch pin guide coupled to the latch pin housing and slidably enclosing at least a portion of the latch pin.

In another embodiment, a magnetic safety gate latch assembly includes a first subassembly and a second subassembly. The first subassembly includes: a pool latch tube having a vertical major axis, the pool latch tube including a top end and a lower end; a lift mechanism comprising a user-actuated lid coupled to the top end of the pool latch tube; a rotatable shaft vertically oriented within the pool latch tube, an upper end of the shaft rigidly coupled to the lift mechanism, and a lower end of the shaft comprising a shaped base; a magnet housing to house a magnet, the magnet housing at least partially enclosing the shaped base, the magnet housing comprising an upper wall having an aperture to cooperatively engage with the shaped base; and a bottom cover coupled to the lower end of the pool latch tube and enclosing the magnet housing, the bottom cover comprising an aperture on a vertical side facing a latch pin housing, the aperture positioned to expose the magnet. The second subassembly includes: the latch pin housing; a ferromagnetic latch pin; and a magnetic latch pin guide coupled to the latch pin housing and slidably enclosing at least a portion of the latch pin.

In another embodiment, a method to operate a magnetic safety gate latch assembly includes the steps of lifting a lift mechanism coupled to a shaped base, engaging the shaped base with a magnet housing, the magnet housing including an aperture to cooperate with the shaped base, rotating the lift mechanism in order to rotate the magnet housing, changing a magnetic attraction between a magnet in the magnet housing and a ferromagnetic latch pin, and retracting the ferromagnetic latch pin in order to unlock the magnetic safety latch assembly.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that presently are preferred, it being understood, however, the embodiments disclosed herein are not limited to the specific instrumentalities disclosed. Included in the drawings are the following figures:

FIG. 8A is an interior front, right and above oblique view of a magnetic safety gate latch system in an open (i.e., unlocked) position, in accordance with an embodiment of the present disclosure;

FIG. 8B is a detailed interior front, right and above oblique view of a portion of a magnetic safety gate latch system in an open position, in accordance with an embodiment of the present disclosure;

Figure 1A:
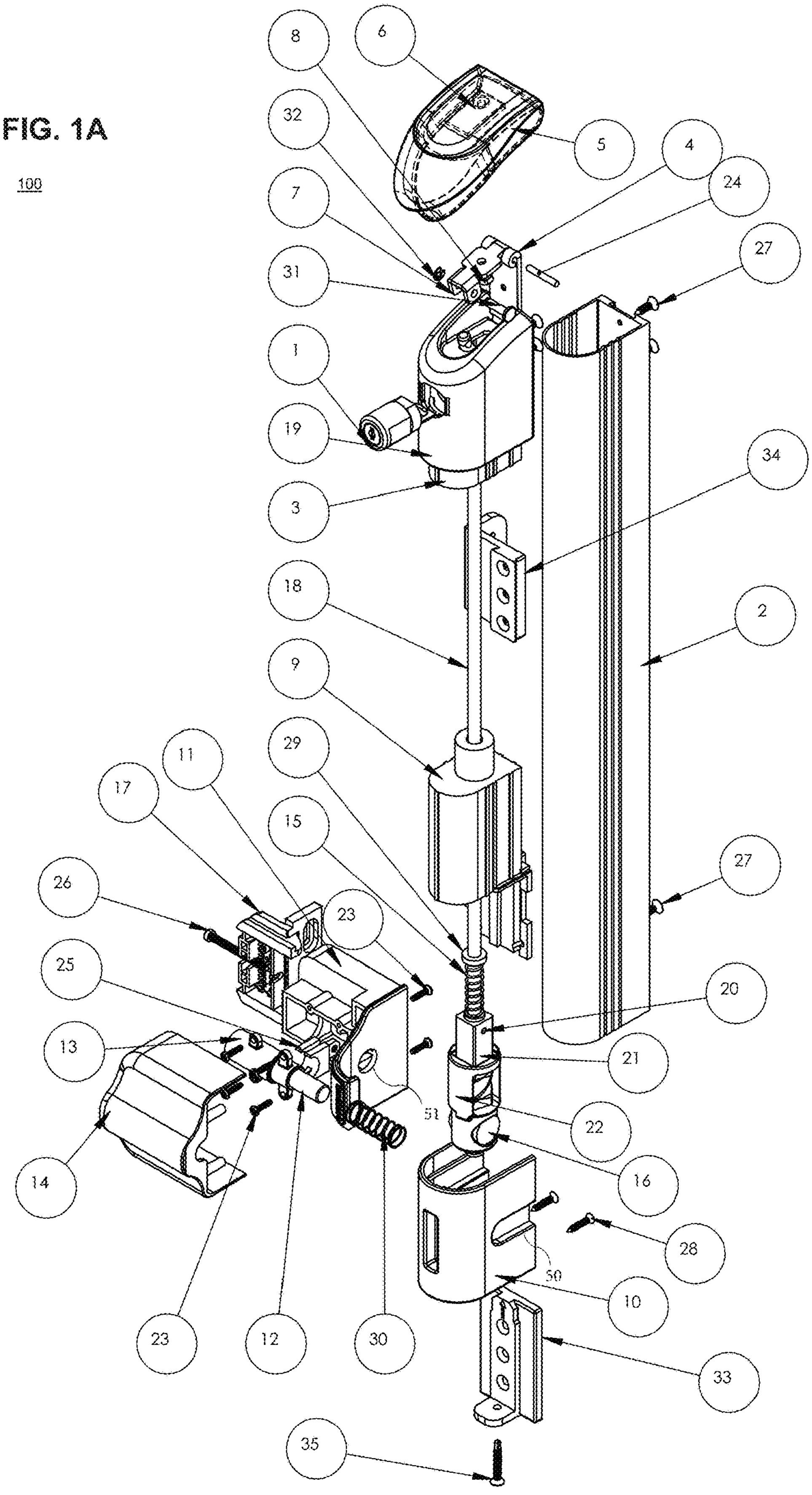
FIG. 1A is an exploded oblique view of a magnetic safety gate latch system, in accordance with an embodiment of the present disclosure.

While embodiments of the present invention are described herein by way of example using several illustrative drawings, embodiments of the present invention are not limited to the embodiments or drawings described. The drawings and the detailed description thereto are not intended to limit the present invention to the particular form disclosed, but also encompass all modification, equivalents and alternatives falling within the spirit and scope of embodiments of the present invention as recited by the claims.

The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" may be used interchangeably herein. The terms "comprising", "including", and "having" also may be used interchangeably.

Embodiments in accordance with the present disclosure provide a latching apparatus and method for a gate, the latching apparatus incorporated with a fence post adjacent to the gate. A magnetic force from a permanent magnet may be used to keep a locking element in a locked position. The locking element may be spring-loaded such that the latching element relaxes to an unlocked state when the magnetic force from the magnet is disrupted or removed. In particular, the magnetic force may be disrupted when the magnet is rotated to break a magnetic field, or if the magnetic field is otherwise blocked.

In particular, embodiments in accordance with the present disclosure may provide a latch pin made of a magnetic material (e.g., steel), which cooperatively engages with a moveable magnet. One of the latch pin and the magnet may be coupled to a gate, and the other of the latch pin and the magnet may be coupled to a fence post. The fence post and the gate may be oriented adjacent to each other when the gate is closed.

Embodiments are usable in various gate and post configurations. For example, embodiments are usable with either a gate for which swing hinges used to swing the gate itself are installed on the right side of the gate, or a gate for which swing hinges are installed on the left side of the gate. Embodiments are also usable with gates that swing inward toward a pool area when the gate is opened, or outward away from the pool area when the gate is opened. With respect to components described in further detail below and in FIG. 1, customization for various gate and post configurations may include whether magnetic latch pin 12, and the assembly immediately surrounding it, is installed to the left or to the right of magnet 16. Latch pin 12 is magnetic because it is made of a material that may be attracted to a magnet, however latch pin 12 is not necessarily itself a magnet. FIGS. 1 through 5E illustrate a configuration that may represent, e.g., a pool latch tube 2 coupled to a right-handed gate, and magnetic latch pin 12 coupled to a fence post toward the left; or, FIGS. 1 through 5E may illustrate a configuration that represents a pool latch tube 2 coupled to a fence post toward the right of a left-handed gate, and magnetic latch pin 12 coupled to the left-handed gate. Some configurations may use a mirror image of the illustration of FIG. 1, e.g., pool latch tube 2 coupled to a fence post to the left of a right-handed gate and magnetic latch pin 12 coupled to the right-handed gate, to the right of the pool latch tube 2.

In one embodiment, when the latch is in a closed position, an end of the magnet will face the latch pin and attract the latch pin by magnetic force. The latch pin so attracted will move into a latch groove. When the latch pin is in the latch groove, the gate will be locked and cannot be opened without damaging the gate.

FIG. 1 illustrates an exploded oblique view of a magnetic safety gate latch assembly 100 in accordance with an embodiment of the present disclosure. Latch assembly 100 may be manufacturable in a variety of heights, with a specific height selected by a customer or installer according to customer need or preference. For example, latch assembly 100 may be manufactured and installed such that a top of latch assembly 100 is about 5-6 feet above the ground, and extends downward to within a few inches of the ground.

Latch assembly 100 includes an elongated pool latch tube 2, oriented such that an axis of the elongated direction of pool latch tube 2 is vertical. Pool latch tube 2 may be attached to either a gate side or a post side of a gated opening in a fence by use of pool latch bracket 34. Pool latch tube 2 houses a mechanism that mechanically transmits a force or action provided by a user, at or near a top end of pool latch tube 2, to a gate locking mechanism at or near a bottom end of pool latch tube 2. For example, a lift mechanism may be used by the user to provide the force or action to be transmitted.

Pool latch tube 2 is coupled at a top end to a pool latch tube top tube cover 19. Top tube cover 19 may include a pool latch top insert 3, which may be inserted into pool latch tube 2 when assembled, to help couple and stabilize top tube cover 19 to pool latch tube 2. Insert 3 may have a smaller cross-sectional size in a horizontal plane, compared to top tube cover 19 and pool latch tube 2, in order to facilitate insertion of insert 3 into pool latch tube 2. Screw(s) 27 also may be used to help couple and stabilize top tube cover 19 to pool latch tube 2. Alternatively, insert 3 may have a larger cross-sectional size in a horizontal plane, compared to pool latch tube 2, in order to facilitate insertion of insert 3 over the outside of pool latch tube 2.

Top tube cover 19 may be coupled to the lift mechanism. In the embodiment illustrated in FIG. 1, the lift mechanism may include pool latch lid 5 mounted to pool latch cover hinge 4, such that pool latch lid 5 may be rotationally coupled to top tube cover 19. The rotational coupling may be by way of pool latch cover hinge 4 and pool latch hinge pin 24. Pool latch lid 5 is further coupled to hinge base 7 by a fastener 6 (e.g., a cap bolt) and nut 8 that threads onto fastener 6. Hinge base 7 may be coupled further to a top end of twist drive shaft 18, e.g., by way of clevis pin 31 configured to pass through cooperating apertures in hinge base 7 and twist drive shaft 18, and secured in place by clip 32.

A user operates latch assembly 100 by pulling up on pool latch lid 5, such that pool latch lid 5 rotates around an axis of rotation formed by pool latch hinge pin 24. As pool latch lid 5 is pulled up, twist drive shaft 18 also is pulled up. Twist drive shaft 18 may be spring loaded such that, absent an upward force from pool latch lid 5, twist drive shaft 18 is pushed or pulled to a lower resting position. Twist drive shaft 18 provides a mechanical linkage to transmit force from pool latch lid 5 to the gate locking mechanism at or near a bottom end of pool latch tube 2, as described below in further detail.

In some embodiments, latch assembly 100 may include an optional pool latch lock assembly 1, which may be a lockable assembly (e.g., key-operated or combination code operated) used by a user to enable or to prevent (depending upon the locked state of pool latch lock assembly 1) twist drive shaft 18 from being pulled up sufficiently to actuate the gate locking mechanism at or near a bottom end of pool latch tube 2. In some embodiments, pool latch lock assembly 1 may be partially or completely hidden behind a portion of pool latch lid 5. The purpose of being hidden would be to provide a more aesthetically pleasing appearance. In those embodiments, pool latch lock assembly 1 may allow a relatively small amount of movement or "play" vertically of twist drive shaft 18 and/or pool latch lid 5, such that when pool latch lock assembly 1 is in a locked state, pool latch lid 5 may be lifted up enough to expose pool latch lock assembly 1 so it can be unlocked, without causing the gate locking mechanism at or near a bottom end of pool latch tube 2 to be actuated or attempted to be actuated. In some embodiments, pool latch lock assembly 1 may be prevented from being locked when the gate locking mechanism is in an open state.

Figure 3A:
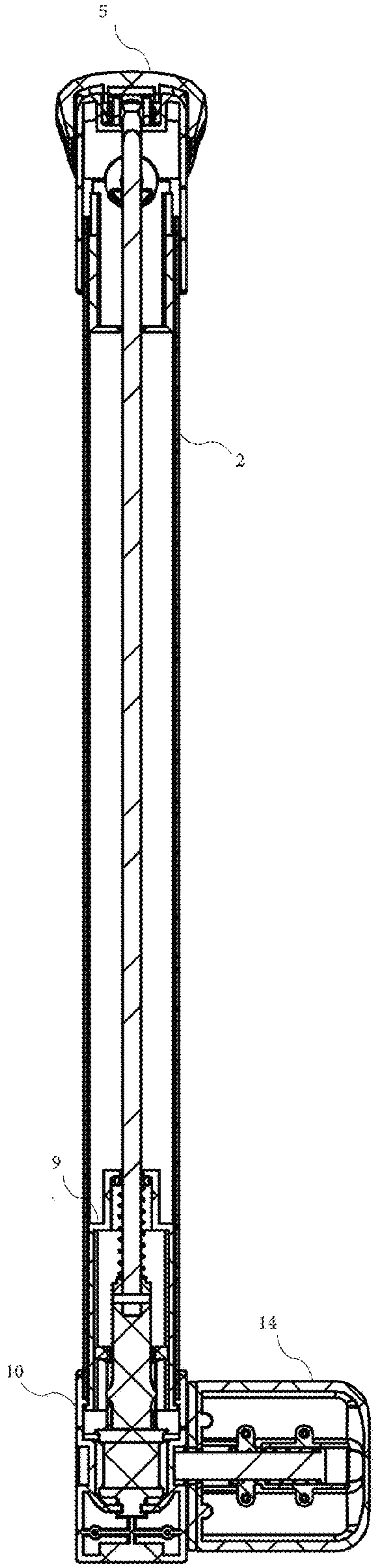
FIG. 3A is a cross-sectional rear plan view of a magnetic safety gate latch system in a locked position, in accordance with an embodiment of the present disclosure.

Pool latch tube 2 is coupled at a bottom end to a pool latch tube bottom cover 10, e.g., by insertion into pool latch tube bottom cover 10 as better shown in FIG. 3A. In turn, pool latch tube bottom cover 10 is coupled to pool latch base 33 (e.g., by sliding onto pool latch base 33 and/or use of fastener(s) 28). Pool latch base 33 in turn is rigidly coupled to a fence element (e.g., gate, post, or upright), not illustrated in FIG. 1A. Fastener 35 may be used to further secure pool latch base 33 to pool latch tube bottom cover 10, as further illustrated in FIG. 2E. Bottom cover 10 may include a pool latch bottom insert 9, which may be inserted into pool latch tube 2 when assembled, to help couple and stabilize bottom cover 10 to pool latch tube 2. Insert 9 may have a smaller cross-sectional size in a horizontal plane, compared to bottom cover 10 and pool latch tube 2, in order to facilitate insertion of insert 9 into pool latch tube 2. Screw(s) 27 also may be used to help couple and stabilize bottom cover 10 to pool latch tube 2.

Bottom pool latch tube bottom cover 10 faces a housing formed from pool latch lock pin base cover 11 and pool latch cover 14, illustrated in exploded form in FIG. 1. Lock pin base cover 11 is coupled to a fence post if pool latch tube 2 is coupled to a gate. Conversely, if pool latch tube 2 is coupled to a fence post then lock pin base cover 11 will be coupled to a gate.

The housing formed by lock pin base cover 11 and pool latch cover 14 may be held together by screws 23. The housing may enclose a spring-loaded magnetic latch pin 12, which in turn is enclosed by magnetic latch pin guide 13. Magnetic latch pin 12 is made from a ferromagnetic material (e.g., steel or iron). In some embodiments, magnetic latch pin 12 itself also may be a permanent magnet. Magnetic latch pin 12, as disposed within the housing, is aligned with aperture 51 in the housing. More specifically, magnetic latch pin 12 and aperture 51 in the housing are collinear within a horizontal plane. In addition, if magnetic latch pin 12 is a magnet, then the north (N) and south(S) magnetic poles of magnetic latch pin also are within the horizontal plane, and oriented to have a predetermined magnetic pole (either N or S) oriented toward aperture 51 in the housing. Aperture 51 in the housing faces bottom cover 10 and is aligned with cooperating latch groove 50 in bottom cover 10 when the gate is in a closed position. Respective latch grooves 50 may be formed in both vertical sides of bottom cover 10 in order to accommodate an installation as illustrated in FIG. 1, or installation that is a mirror image of FIG. 1. Threaded adjuster 25 may be used to help maintain alignment of magnetic latch pin 12 with aperture 51 in the housing.

Latch groove 50 and aperture 51 are sized to permit magnetic latch pin 12 to pass through each at least partially. Therefore, the diameters of both latch groove 50 and aperture 51 should be at least as large as the diameter of magnet latch pin 12. The diameters of latch groove 50 and aperture 51 should be somewhat larger in order to allow for tolerance in mismatch arising from initial installation and usage or aging over time. However, the diameters of latch groove 50 and aperture 51 should not be excessively large compared to the diameter of magnet latch pin 12, because excessive size may allow excessive relative movement between the gate and the fence post, even when the gate is locked. In some embodiments, the diameters of latch groove 50 and aperture 51 should be about 25% larger than the diameter of the magnet latch pin 12.

Spring 30 may be used to load magnetic latch pin 12 such that in a relaxed state (i.e., not magnetically attracted), magnetic latch pin 12 is retracted within the housing formed by lock pin base cover 11 and pool latch cover 14. Spring 30 may be located inside magnetic latch pin guide 13, as better illustrated in FIG. 4A and FIG. 4I. In an attracted state (i.e., magnetically attracted to a cooperating magnetic or ferromagnetic material within bottom cover 10), magnetic latch pin 12 may be pulled partially through latch groove 50 and aperture 51. In the attracted state, magnetic latch pin 12 acts as a physical barrier to prevent the gate from being opened relative to the fence post, because magnetic latch pin 12 will be situated partially within latch groove 50 and partially within aperture 51. The housing and bottom cover 10 will not be able to move significantly relative to each other because, as they move, latch groove 50 and aperture 51 no longer would be collinearly aligned with magnetic latch pin 12. A significant movement is one that would allow the gate to open sufficiently to allow a person to pass through the gate. Within the housing formed by lock pin base cover 11 and pool latch cover 14, pool latch lock pin base bracket 17 and adjustment screw 26 together may be used to maintain the proper placement and alignment of magnetic latch pin 12.

Magnetic latch pin 12 may be sized in order to be sufficiently stiff in order to prevent opening of a pool gate relative to a pool fence post when a horizontal force is applied by a person, e.g., a child who is being prevented from entering or exiting a pool area, while magnetic latch pin 12 is in the attracted state. In some embodiments, the horizontal force may be at least about 20 pounds of pressure. In some embodiments, magnetic latch pin 12 may be a cylindrical rod having a length of about four inches and a diameter of about 0.5 inches.

A magnet 16 is rotatably situated within pool latch bottom insert 9, such that the N and S poles of magnet 16 are in the same plane as magnetic latch pin 12, latch groove 50 and aperture 51. Magnet 16 is oriented such that in an attracted state (i.e., pool latch lid 5 not being actuated and the gate is locked), magnet 16 and magnetic latch pin 12 face each other and are magnetically attracted to each other, such that latch assembly 100 is in a locked position.

If magnetic latch pin 12 is a magnet, then magnet 16 and magnetic latch pin 12 ordinarily may face each other with opposite poles so that they magnetically attract each other. For example, if a N pole of magnetic latch pin 12 faces magnet 16, then a S pole of magnet 16 faces magnetic latch pin 12 in order to cause the two magnets to attract each other, such that latch assembly 100 is in a locked position.

Spring 30 should be stiff enough to force ferromagnetic magnetic latch pin 12 to retract in the absence of a magnetic attraction between magnet 16 and ferromagnetic magnetic latch pin 12, but not so strong as to prevent motion of magnet 16 and ferromagnetic magnetic latch pin 12 toward each other in the presence of a magnetic attraction between magnet 16 and ferromagnetic magnetic latch pin 12. Thus, the desired stiffness of spring 30 is an engineering balance with the magnetic attraction between magnet 16 and ferromagnetic magnetic latch pin 12. Spring 30 may be made of a dielectric or non-ferromagnetic material, such as a stiff but resilient plastic.

A magnet housing 22 houses and supports magnet 16, holding magnet 16 in a known orientation that changes as magnetic safety gate latch assembly 100 is operated. Magnet housing 22 is moveably coupled to a twist drive 21. Twist drive 21 in turn is rigidly coupled to twist drive shaft 18. Twist drive 21 may have a helical thread (or thread of similar shape) where twist drive 21 is coupled to magnet housing 22.

Twist drive pin 20 may be inserted through twist drive 21 to engage with twist drive shaft 18, in order to keep twist drive 21 coupled to twist drive shaft 18 and to maintain their relative orientation.

Twist drive 21 may have a larger cross-sectional area in a horizontal plane than twist drive shaft 18, thus providing a surface upon which one end of a compression spring 15 ordinarily rests. Compression spring 15 encircles and is substantially coaxial with twist drive shaft 18. A flange washer 29 is located upon a top end of compression spring 15. As better illustrated in the assembled views of FIG. 3A and FIG. 4A described below, flange washer 29 is pressed against a top inner surface of pool latch bottom insert 9 by compression spring 15. Flange washer 29 provides an unmoveable surface for compression spring 15, whereas an opposite end of compression spring 15 is moveable as magnetic safety gate latch assembly 100 is operated.

As described above, twist drive shaft 18 is coupled to pool latch lid 5, and twist drive shaft 18 moves up and down as pool latch lid 5 is fully moved up and down. When twist drive shaft 18 is moved up by a user, twist drive 21 also moves up, and the helically-threaded portion of twist drive 21 engages with magnet housing 22 to cause magnet housing 22 to rotate. In some embodiments (not illustrated), magnet housing 22 may include a helical thread either instead of or in addition to a helical thread on twist drive 21. If a 1.0 inch movement of twist drive shaft 18 produces a 90 degree rotation of magnet housing 22, then the pitch of the helical thread is 0.25 threads per inch (TPI), or conversely 4 inches per thread. When the user releases pool latch lid 5, compression spring 15 pushes down upon twist drive 21, causing magnet housing 22 to rotate back into a locked position.

As magnet housing 22 begins to rotate away from a locked state, the magnetic attraction of magnet 16 and magnetic latch pin 12 weakens and finally breaks as the degree of rotation increases. In some embodiments, a combination of pitch of the helically-threaded twist drive 21 and distance of travel of twist drive shaft 18 caused by operation of pool latch lid 5 will cause magnet housing 22 to rotate about 90 degrees, effectively extinguishing the magnetic coupling between magnet 16 and magnetic latch pin 12. Once the magnetic coupling is extinguished, spring 30 will tend to force magnetic latch pin 12 into a fully retracted position, such that magnetic latch pin 12 no longer acts as a physical barrier to prevent opening of a gate relative to an adjacent post.

In other embodiments, if magnetic latch pin 12 itself is a permanent magnet, the same distance of travel of twist drive shaft 18 may cause about a 180 degree rotation of magnet housing 22, thus causing magnet 16 and magnetic latch pin 12 to tend to repel each other.

In other embodiments, when magnetic latch pin 12 itself is a permanent magnet, spring 30 is optional and may be configured to tend to push magnetic latch pin 12 toward magnet 16 in the absence of magnetic coupling between magnet 16 and magnetic latch pin 12, causing the gate to be locked. The gate would be unlocked by rotating magnet housing 22 such that magnet 16 and magnetic latch pin 12 repel each other. In other embodiments, when magnetic latch pin 12 is a permanent magnet and spring 30 is not used, motion of magnetic latch pin 12 may be caused by only by the force of magnetic attraction or repulsion with magnet 16.

Figure 1B:
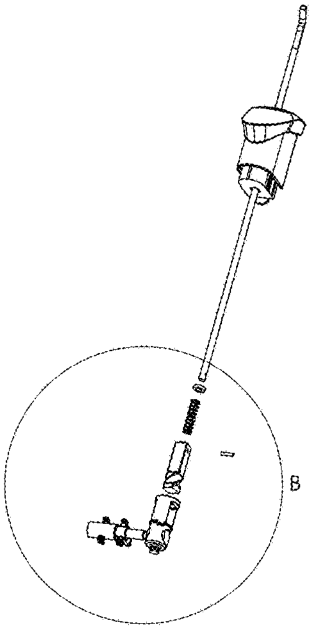
FIG. 1B is an exploded oblique view of an inner portion of the magnetic safety gate latch system of FIG. 1A, in accordance with an embodiment of the present disclosure.

FIG. 1B is an exploded oblique view of an inner portion of magnetic safety gate latch assembly 100 of FIG. 1A, in accordance with an embodiment of the present disclosure. A portion of FIG. 1B is marked as Detail B.

Figure 1C:
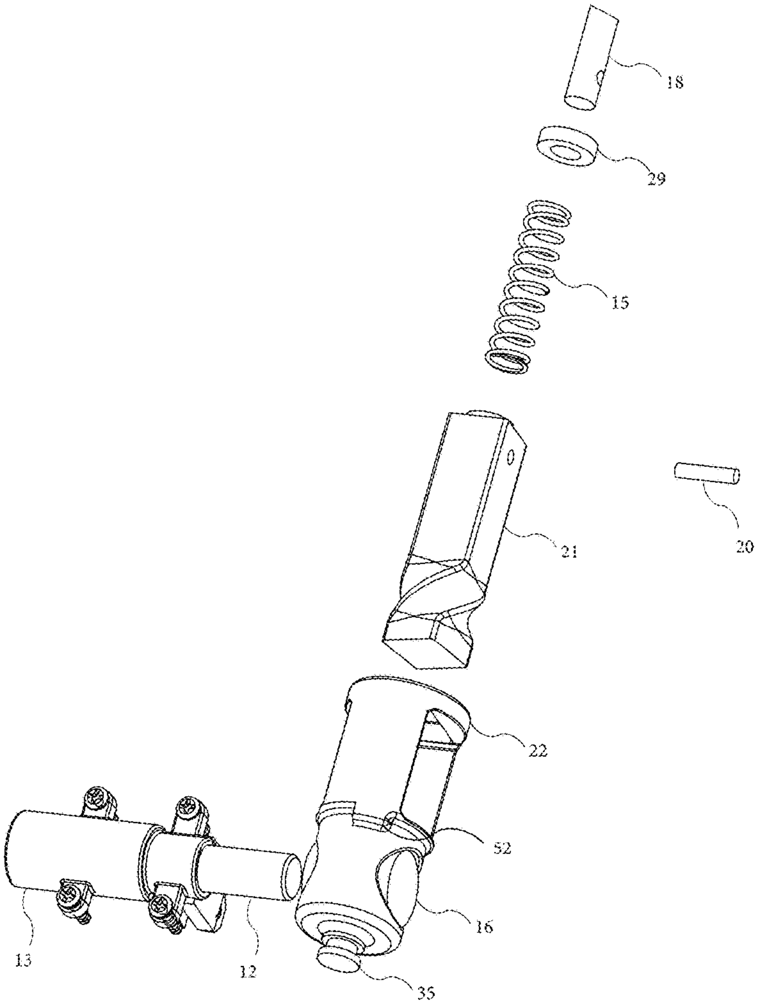
FIG. 1C is a detailed exploded oblique view of a portion of FIG. 1B, in accordance with an embodiment of the present disclosure.

FIG. 1C is a detailed exploded oblique view of a portion of FIG. 1B, in accordance with an embodiment of the present disclosure. FIG. 1C adds a view of tab 52, which may be used as a hard stop to prevent magnet housing 22 from over-rotating more than a preset amount of rotation, e.g., 90 degrees or 180 degrees.

Figure 2A:
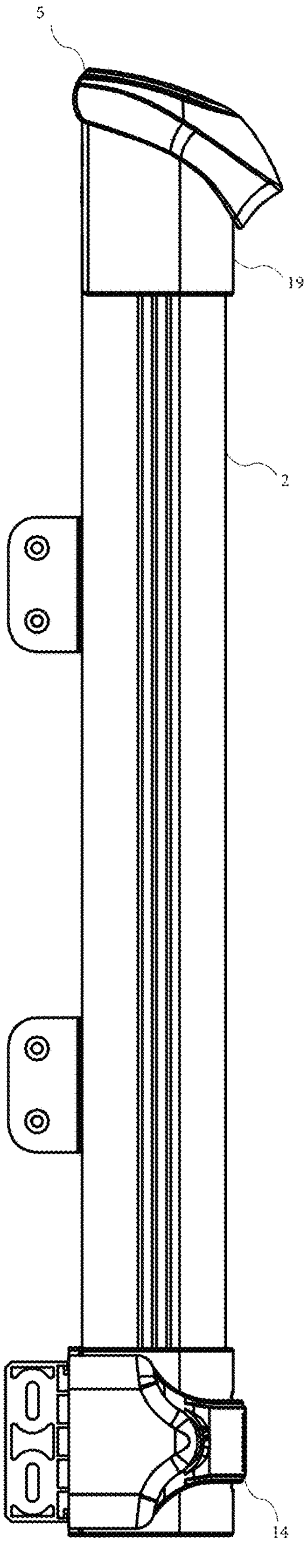
FIG. 2A is an exterior left plan view of a magnetic safety gate latch system in a locked position, in accordance with an embodiment of the present disclosure.
Figure 2B:
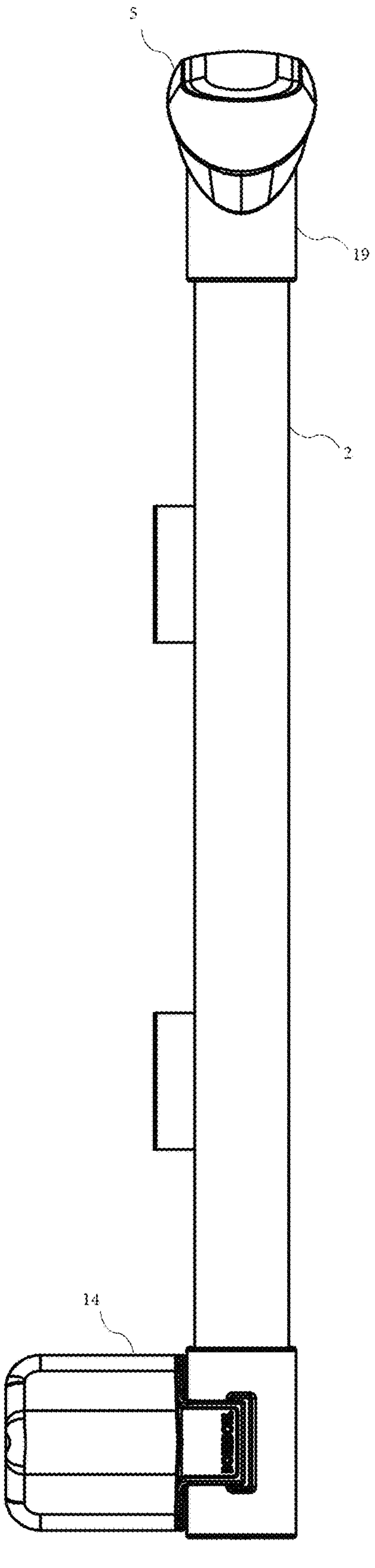
FIG. 2B is an exterior front plan view of a magnetic safety gate latch system in a locked position, in accordance with an embodiment of the present disclosure.
Figure 2C:
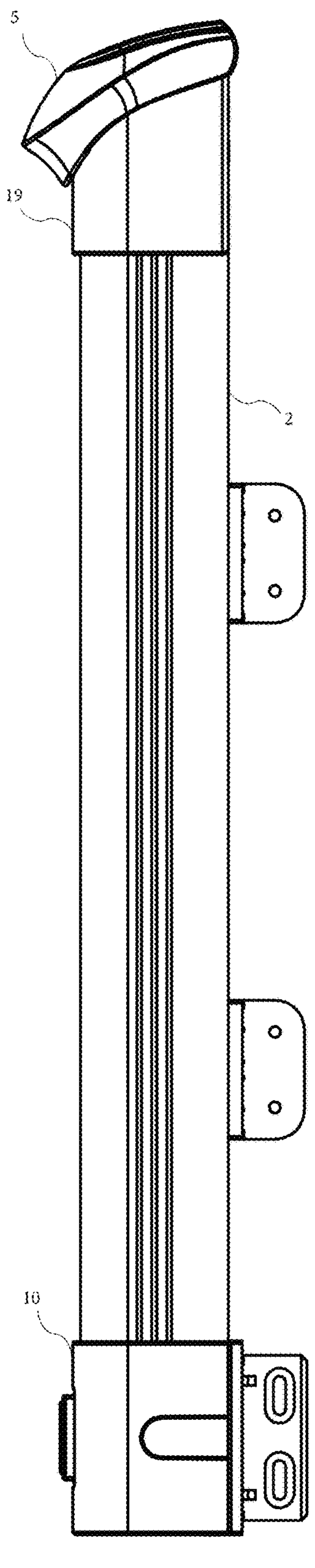
FIG. 2C is an exterior right plan view of a magnetic safety gate latch system in a locked position, in accordance with an embodiment of the present disclosure.
Figure 2D:
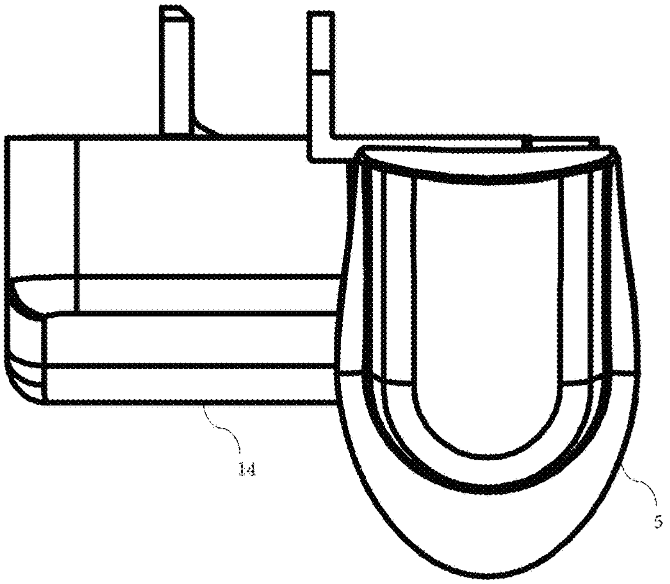
FIG. 2D is an exterior top plan view of a magnetic safety gate latch system, in accordance with an embodiment of the present disclosure.
Figure 2E:
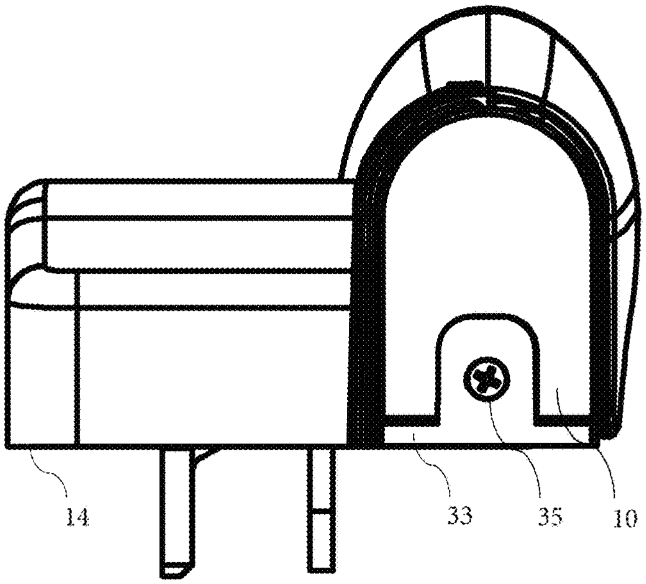
FIG. 2E is an exterior bottom plan view of a magnetic safety gate latch system, in accordance with an embodiment of the present disclosure.

FIG. 2A illustrates a left side plan view of the exterior of magnetic safety gate latch assembly 100, in accordance with an embodiment of the present disclosure. Features illustrated and described with respect to FIG. 1 are assigned like reference numbers. FIG. 2B illustrates a front plan view of magnetic safety gate latch assembly 100, with front defined as the direction facing a user who will be actuating pool latch lid 5 and/or unlocking pool latch lock assembly 1. FIG. 2C illustrates a right plan view of magnetic safety gate latch assembly 100.

Figure 3B:
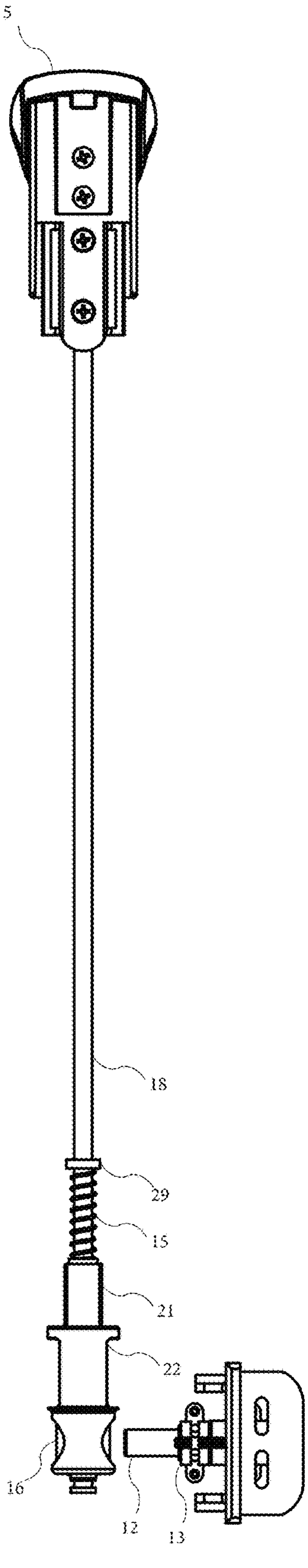
FIG. 3B is an interior rear plan view of a magnetic safety gate latch system in a locked position, in accordance with an embodiment of the present disclosure.

FIG. 3A illustrates a rear cross-sectional plan view of magnetic safety gate latch assembly 100 in a locked position, in accordance with an embodiment of the present disclosure. FIG. 3B illustrates a rear view of the magnetic safety gate latch assembly 100 of FIG. 3A, but without certain exterior elements such as pool latch tube 2, lock pin base cover 11, pool latch cover 14, bottom cover 10 and pool latch bottom insert 9, in order to better illustrate the interrelationship of the remaining elements.

Figure 3C:
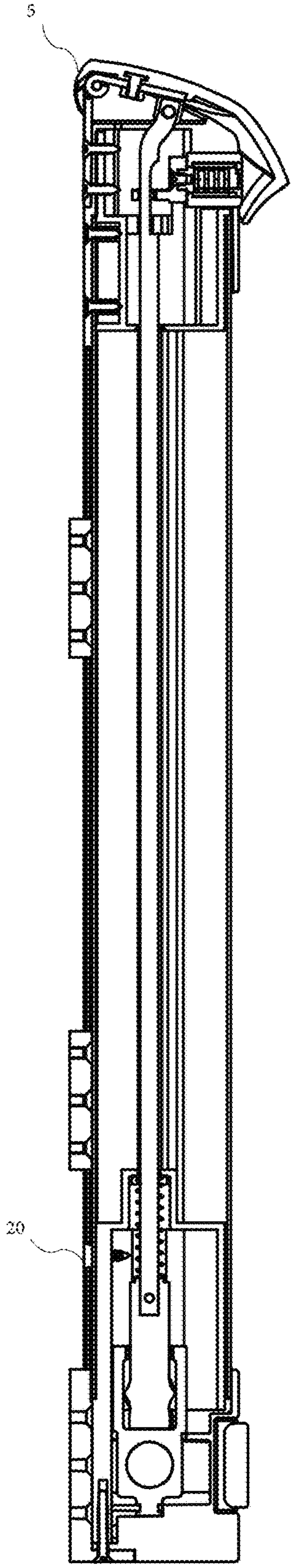
FIG. 3C is a cross-sectional left plan view of a magnetic safety gate latch system in a locked position, in accordance with an embodiment of the present disclosure.
Figure 3D:
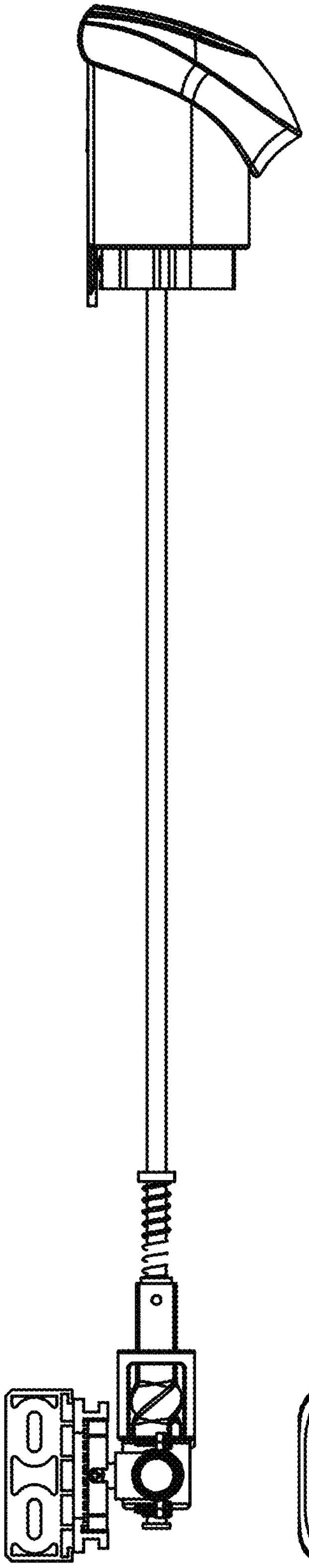
FIG. 3D is an interior left plan view of a magnetic safety gate latch system in a locked position, in accordance with an embodiment of the present disclosure.

FIG. 3C illustrates a left side cross-sectional plan view of magnetic safety gate latch assembly 100 in a locked position, in accordance with an embodiment of the present disclosure. FIG. 3D illustrates the magnetic safety gate latch assembly 100 of FIG. 3C, but with certain exterior elements omitted for clarity.

Figure 3E:
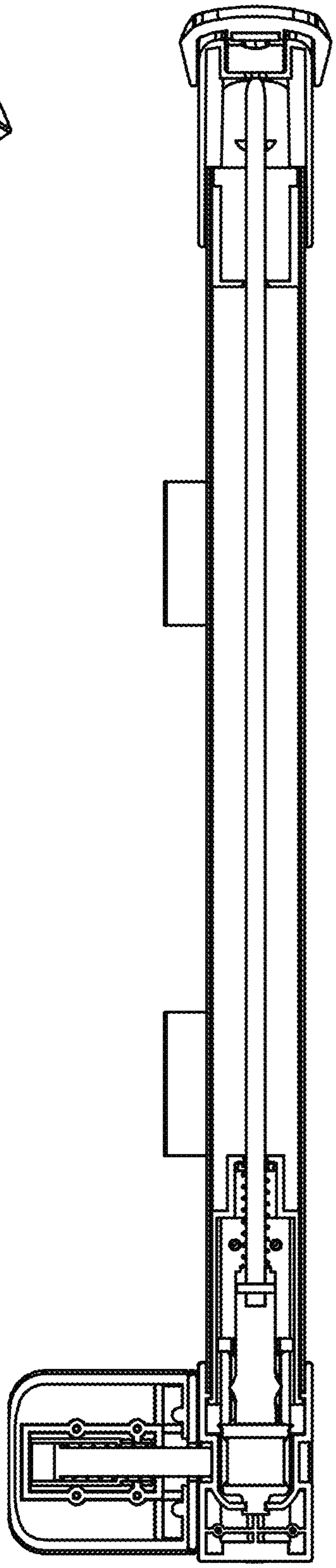
FIG. 3E is a cross-sectional front plan view of a magnetic safety gate latch system in a locked position, in accordance with an embodiment of the present disclosure.
Figure 3F:
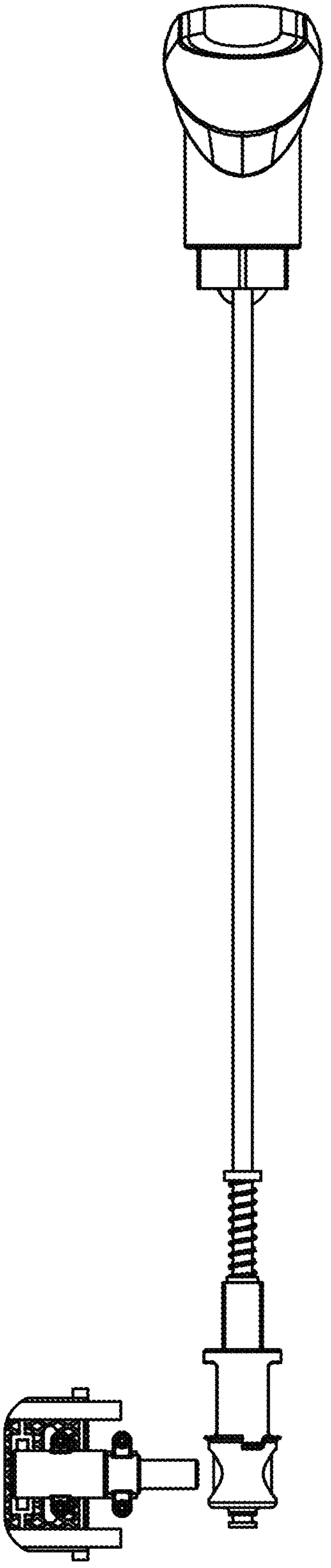
FIG. 3F is an interior front plan view of a magnetic safety gate latch system in a locked position, in accordance with an embodiment of the present disclosure.

FIG. 3E illustrates a front cross-sectional plan view of magnetic safety gate latch assembly 100 in a locked position, in accordance with an embodiment of the present disclosure. FIG. 3F illustrates the magnetic safety gate latch assembly 100 of FIG. 3E, but with certain exterior elements omitted for clarity.

Figure 3G:
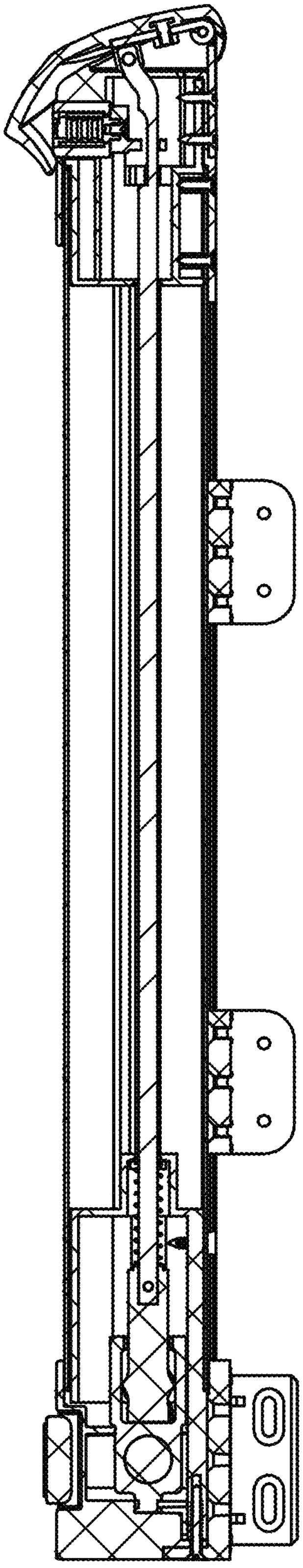
FIG. 3G is a cross-sectional right plan view of a magnetic safety gate latch system in a locked position, in accordance with an embodiment of the present disclosure.
Figure 3H:
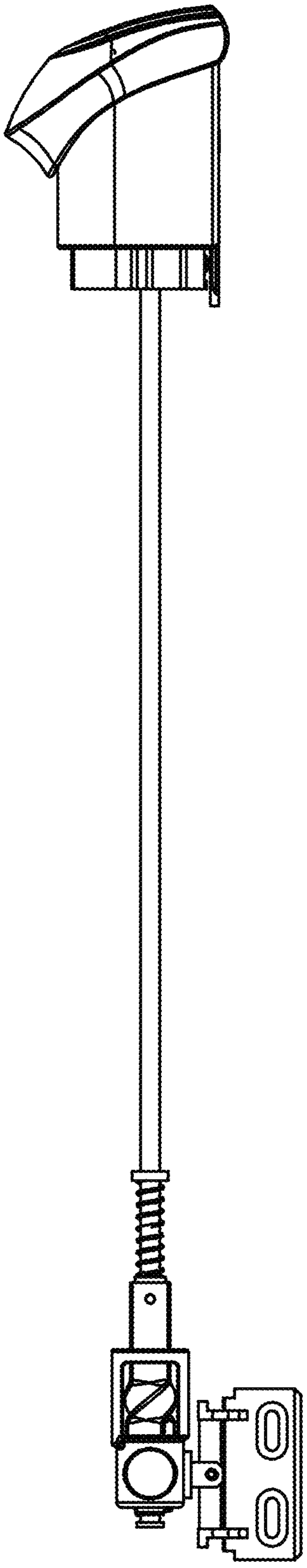
FIG. 3H is an interior right plan view of a magnetic safety gate latch system in a locked position, in accordance with an embodiment of the present disclosure.

FIG. 3G illustrates a right side cross-sectional plan view of magnetic safety gate latch assembly 100 in a locked position, in accordance with an embodiment of the present disclosure. FIG. 3H illustrates the magnetic safety gate latch assembly 100 of FIG. 3G, but with certain exterior elements omitted for clarity.

Figure 4A:
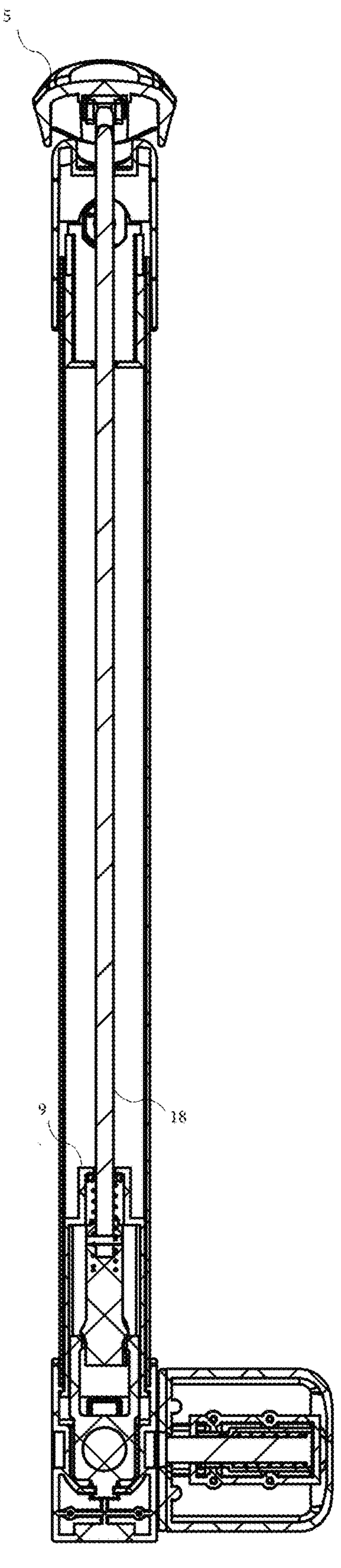
FIG. 4A is a cross-sectional rear plan view of a magnetic safety gate latch system in an unlocked position, in accordance with an embodiment of the present disclosure.
Figure 4B:
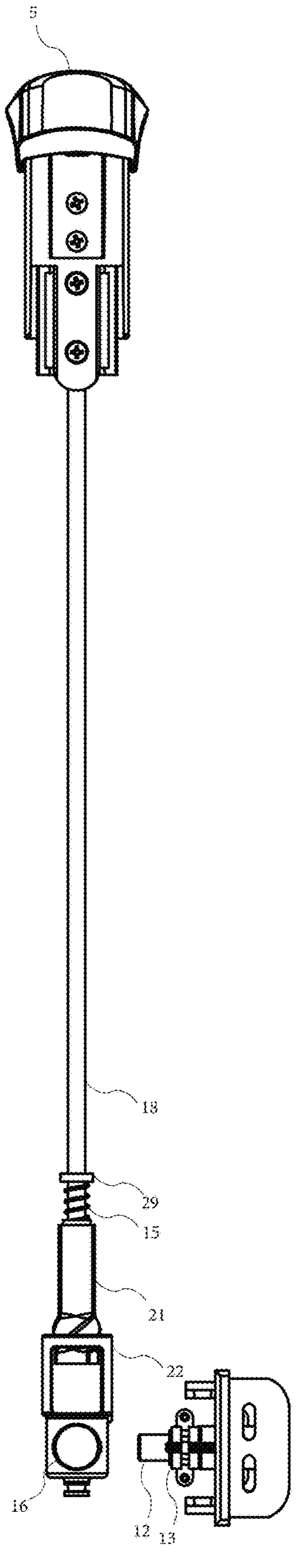
FIG. 4B is an interior rear plan view of a magnetic safety gate latch system in an unlocked position, in accordance with an embodiment of the present disclosure.

FIG. 4A illustrates a rear cross-sectional plan view of magnetic safety gate latch assembly 100 in an unlocked position, in accordance with an embodiment of the present disclosure. FIG. 4B illustrates the magnetic safety gate latch assembly 100 of FIG. 4A, but without certain elements such as pool latch tube 2 such as lock pin base cover 11, pool latch cover 14, bottom cover 10 and pool latch bottom insert 9, in order to better illustrate the interrelationship of the remaining elements.

Figure 4C:
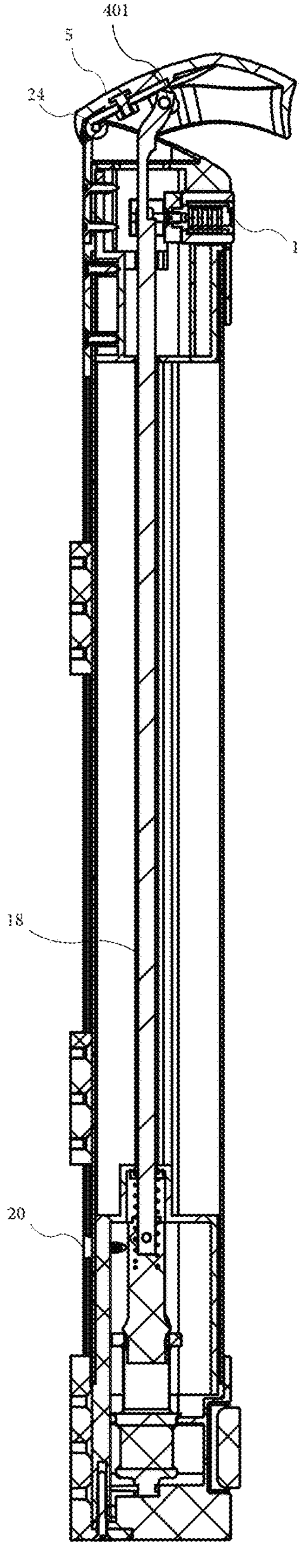
FIG. 4C is a cross-sectional left plan view of a magnetic safety gate latch system in an unlocked position, in accordance with an embodiment of the present disclosure.

FIG. 4C illustrates a left side cross-sectional plan view of magnetic safety gate latch assembly 100 in an unlocked position, in accordance with an embodiment of the present disclosure. Coupling 401 is a point at which pool latch lid 5 is coupled to twist drive shaft 18. As illustrated in FIG. 4C, coupling 401 is not coaxial with pool latch hinge pin 24, such that as pool latch lid 5 is rotated up and down around pool latch hinge pin 24, twist drive shaft 18 will correspondingly be moved up and down.

Figure 4D:
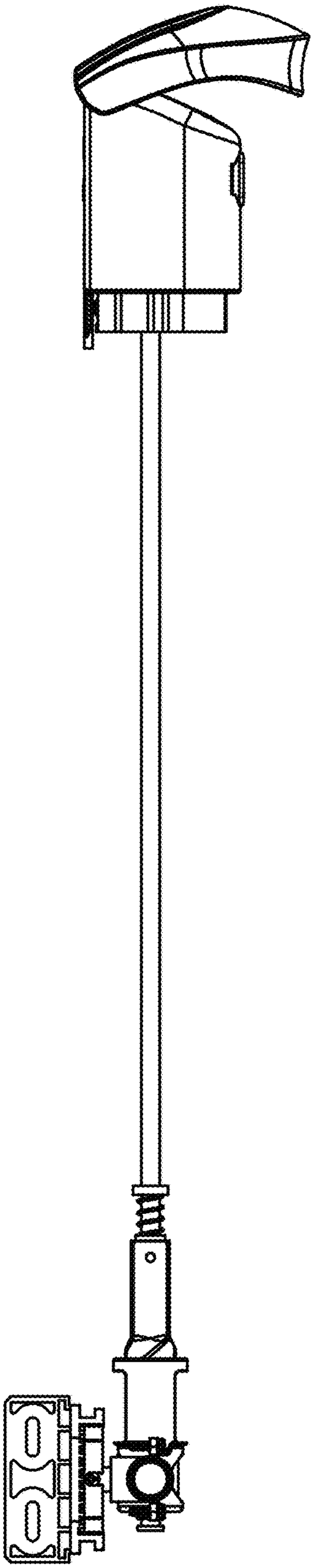
FIG. 4D is an interior left plan view of a magnetic safety gate latch system in an unlocked position, in accordance with an embodiment of the present disclosure.

FIG. 4D illustrates the magnetic safety gate latch assembly 100 of FIG. 4C, but without certain exterior elements.

Comparing FIGS. 4A-4C in an unlocked position to FIGS. 3A-3C in a locked position, it can be seen in the former that pool latch lid 5 has been lifted up, and pool latch lock assembly 1 is accessible. Twist drive shaft 18 has been pulled up by the user action of lifting pool latch lid 5, as best seen in FIG. 4C. Twist drive shaft 18 in turn pulls up twist drive 21. As twist drive 21 pulls up, magnet housing 22 rotates around a vertical axis. At full travel of pool latch lid 5, magnet housing 22 has been rotated by 90 degrees compared to the configuration of FIGS. 3A-3C, thus breaking the magnetic attraction between magnet 16 and magnetic latch pin 12. Spring 30 will tend to push magnetic latch pin 12 back within magnet housing 22 once the magnetic attraction is broken.

Figure 4E:
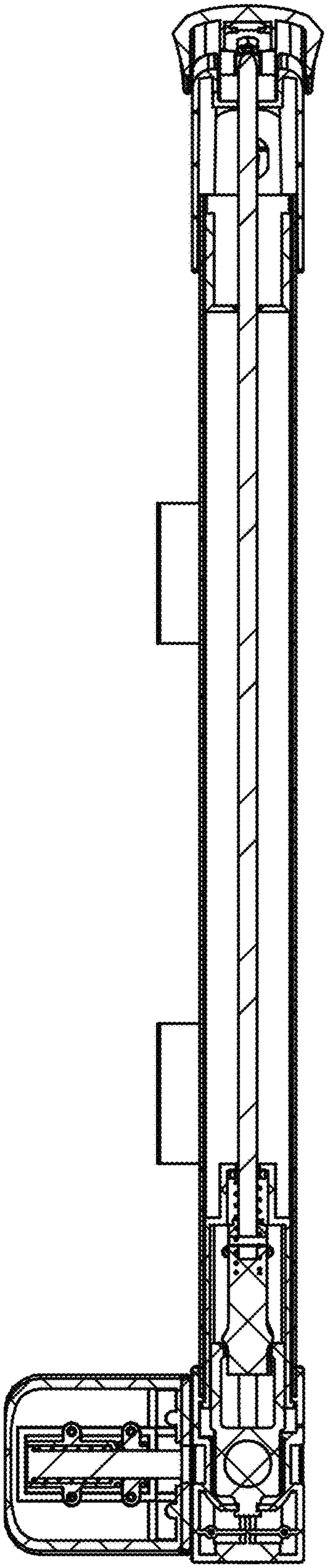
FIG. 4E is a cross-sectional front plan view of a magnetic safety gate latch system in an unlocked position, in accordance with an embodiment of the present disclosure.
Figure 4F:
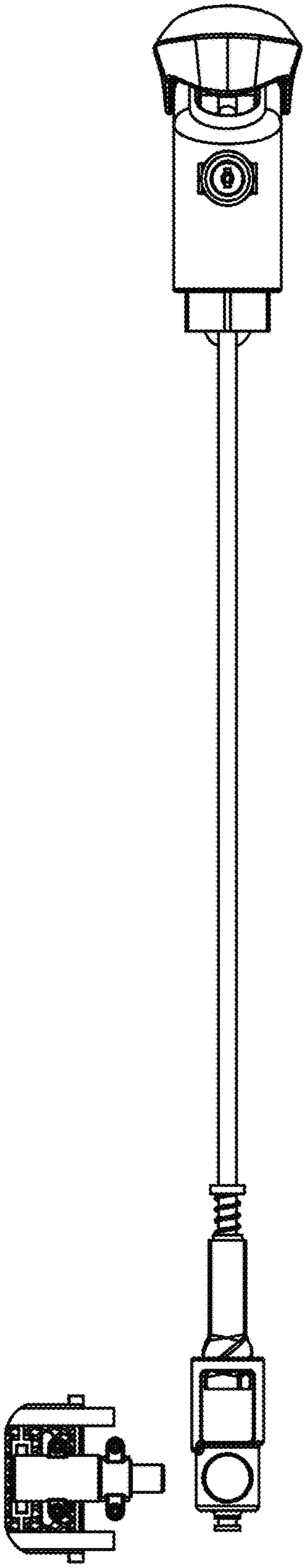
FIG. 4F is an interior front plan view of a magnetic safety gate latch system in an unlocked position, in accordance with an embodiment of the present disclosure.

FIG. 4E illustrates a front cross-sectional plan view of magnetic safety gate latch assembly 100 in an unlocked position, in accordance with an embodiment of the present disclosure. FIG. 4F illustrates the magnetic safety gate latch assembly 100 of FIG. 4E, but without certain elements.

Figure 4G:
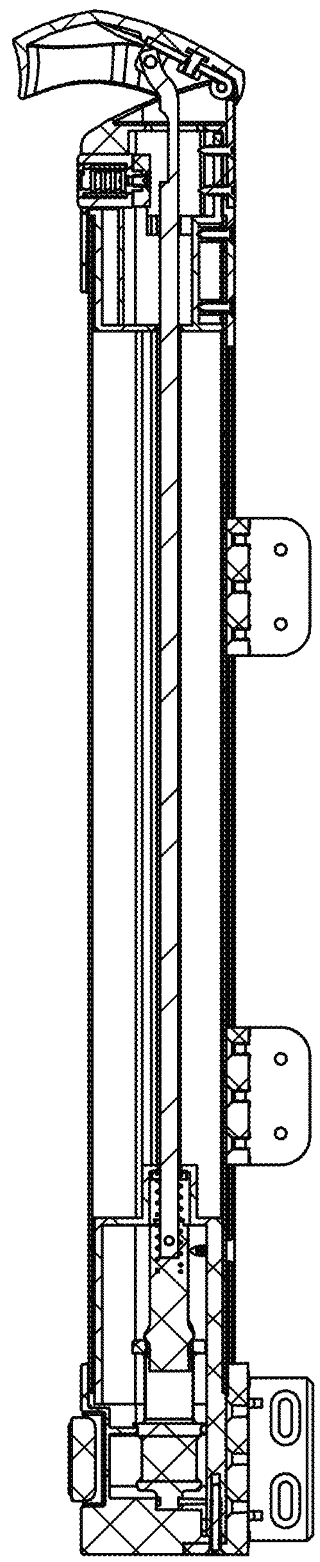
FIG. 4G is a cross-sectional right plan view of a magnetic safety gate latch system in an unlocked position, in accordance with an embodiment of the present disclosure.
Figure 4H:
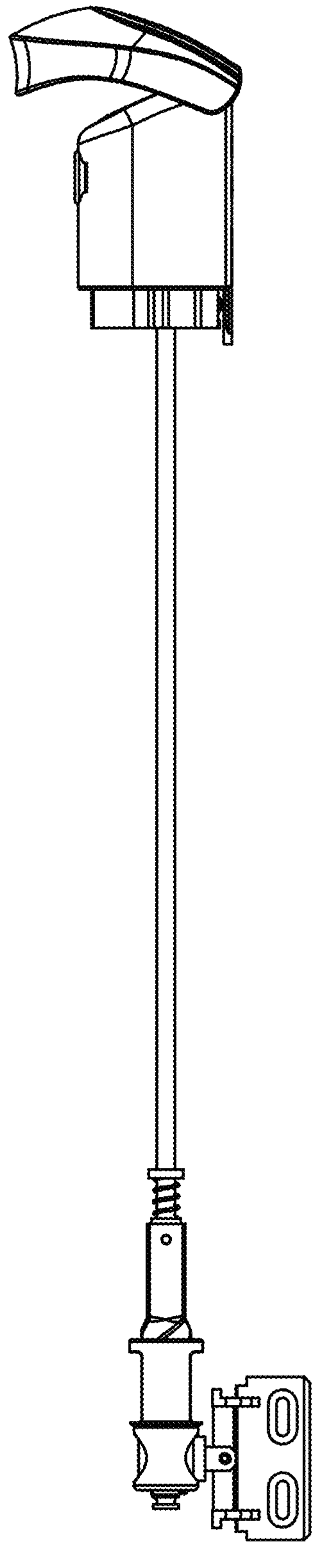
FIG. 4H is an interior right plan view of a magnetic safety gate latch system in an unlocked position, in g accordance with an embodiment of the present disclosure.

FIG. 4G illustrates a right side cross-sectional plan view of magnetic safety gate latch assembly 100 in a locked position, in accordance with an embodiment of the present disclosure. FIG. 4H illustrates the magnetic safety gate latch assembly 100 of FIG. 4G, but without certain elements.

Figure 4I:
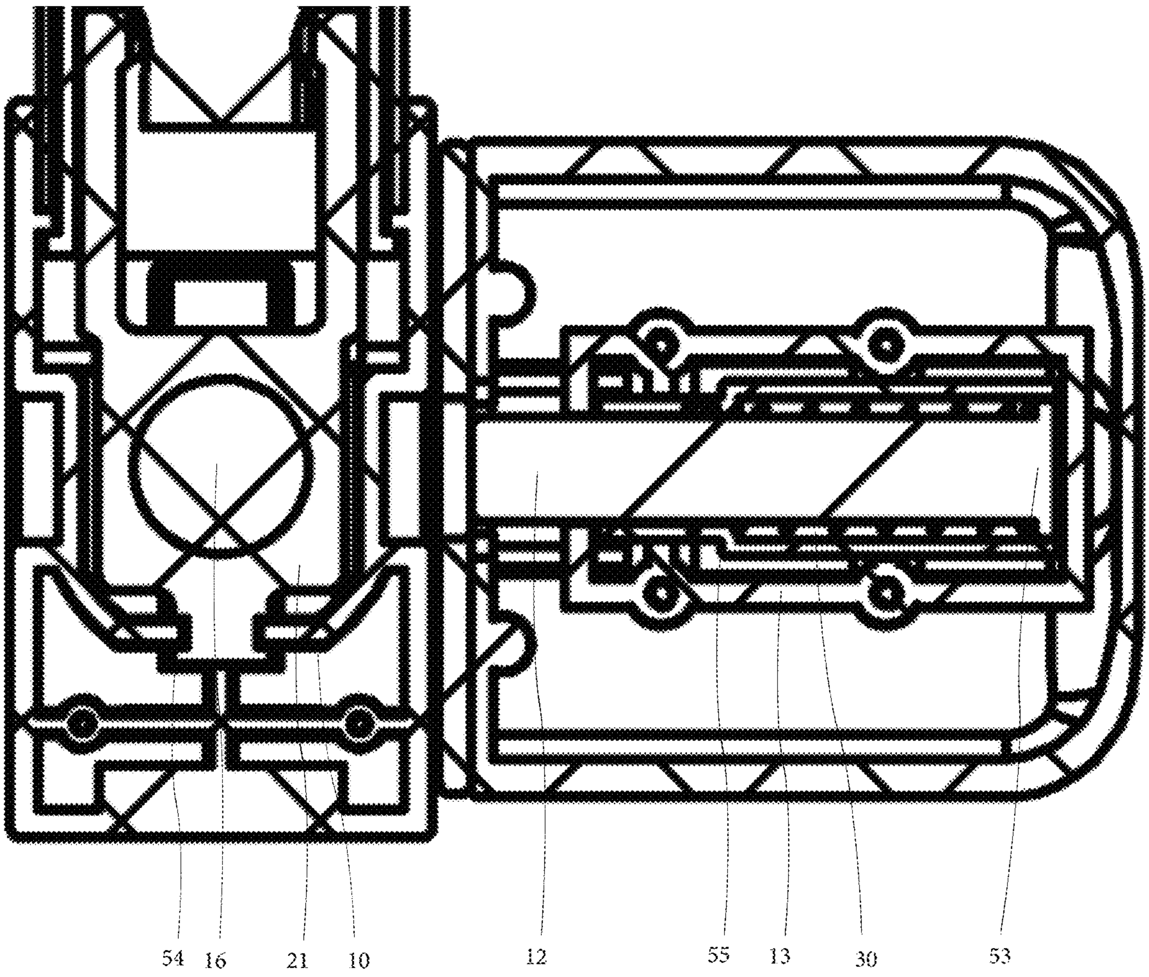
FIG. 4I is detailed view of a portion of FIG. 4A, in accordance with an embodiment of the present disclosure.

FIG. 4I illustrates a detailed view of a portion of the cross-sectional view of FIG. 4A, in accordance with an embodiment of the present disclosure. FIG. 4I illustrates magnetic safety gate latch assembly 100 in an unlocked position, i.e., a face of magnet 16 is illustrated parallel to the plane of FIG. 4I and facing away from magnetic latch pin 12. FIG. 4I better illustrates placement of spring 30 inside magnetic latch pin guide 13, concentrically encircling magnetic latch pin 12. Magnetic latch pin 12 includes a flanged portion 53 located at a distal end of magnetic latch pin 12, distal from magnet 16. One end of spring 30 pushes against flanged portion 53, and the other end of spring 30 pushes against a shoulder portion 55 of the interior of magnet latch pin guide 13. In the unlocked position of assembly 100, spring 30 will have pushed flanged portion 53 to a distal end of magnetic latch pin guide 13. In a locked position of assembly 100 (not illustrated), magnetic latch pin 12 will be magnetically attracted toward magnet 16, thus forcing spring 30 to be relatively compressed. The potential energy stored in spring 30 by the compression will tend to force magnetic latch pin 12 into an unlocked position once the magnetic attraction to magnet 16 is disrupted.

Figure 14:
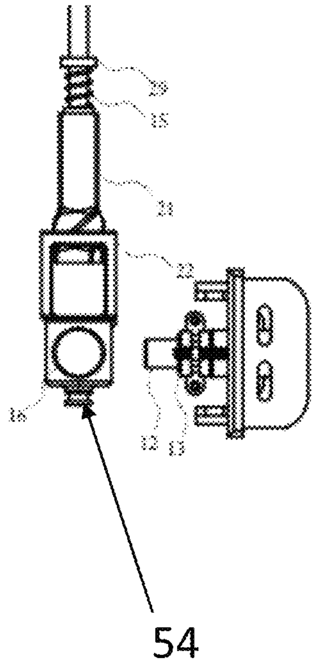
FIG. 14 is a partially exploded view of a portion of FIG. 4A, in accordance with an embodiment of the present disclosure.

FIG. 4I further illustrates a flanged portion 54 of magnet housing 22. Flanged portion 54 mates with bottom tube cover 10. The mating of flanged portion 54 and bottom tube cover 10 prevents magnet housing 22 from moving vertically as twist drive shaft 18 is moved up and down by the user, without preventing twist drive 21 from rotating around a vertical axis. A partially exploded view is shown in FIG. 14.

In an alternate embodiment (not illustrated), a spring within magnetic latch pin guide 13 may be fixedly attached to an interior end face of magnetic latch pin guide 13 and a facing surface of flanged portion 53. The spring may be sized such that in a state of the spring that is neithe compressed nor stretched, magnetic latch pin 12 may be in an unlocked state when there is no magnetic attraction between magnetic latch pin 12 and magnet 16. When a magnetic attraction is introduced between magnetic latch pin 12 and magnet 16, pulling magnetic latch pin 12 into a locked state, the spring may be stretched. Once the magnetic attraction is removed, the spring may compress and pull magnetic latch pin 12 back into an unlocked state.

In an alternate embodiment (not illustrated) if magnetic latch pin 12 itself is a magnet, a spring within magnetic latch pin guide 13 may be sized and positioned (e.g., within magnetic latch pin guide 13 between flanged portion 53 and a distal end of magnetic latch pin guide 13) such that in a state of the spring that is neither compressed nor stretched, magnetic latch pin 12 may be in a locked state when there is no magnetic repulsion between magnetic latch pin 12 and magnet 16. When a magnetic repulsion is introduced between magnetic latch pin 12 and magnet 16 to force magnetic latch pin 12 into an unlocked state, the spring may be compressed. Once the magnetic repulsion is removed, the spring may decompress and push magnetic latch pin 12 back into a locked state.

Figure 5A:
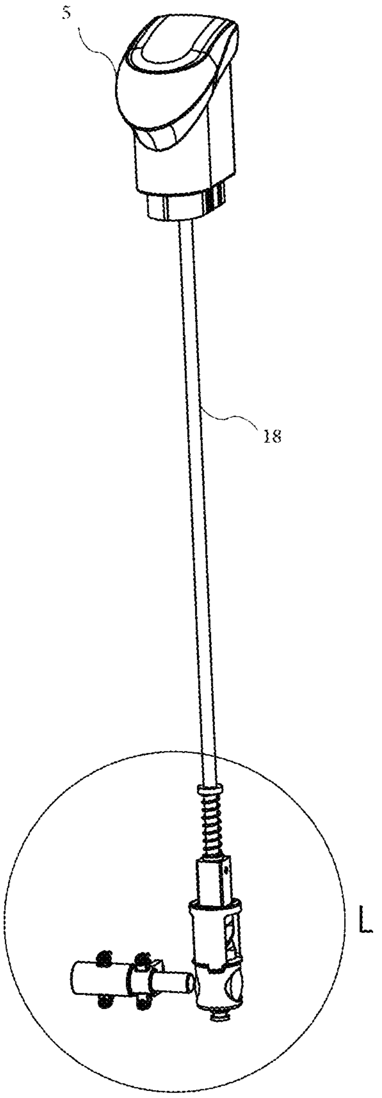
FIG. 5A is an interior front, right and above oblique view of a magnetic safety gate latch system in a closed (i.e., locked) position, in accordance with an embodiment of the present disclosure.
Figure 5B:
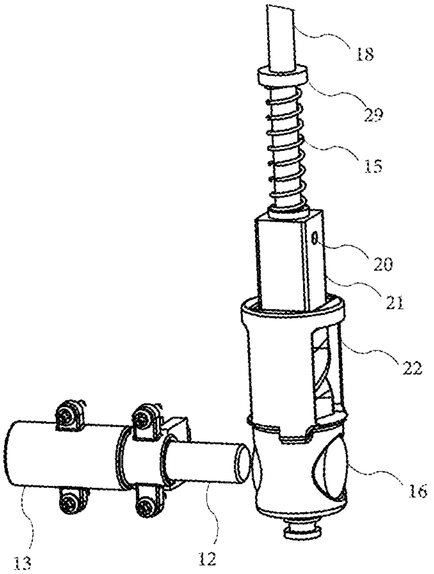
FIG. 5B is a detailed interior front, right and above oblique view of a portion of a magnetic safety gate latch system in a closed position, in accordance with an embodiment of the present disclosure.

FIG. 5A illustrates a front, right, and above oblique view of an interior portion of magnetic safety gate latch assembly 100, in accordance with an embodiment of the present disclosure. FIG. 5A illustrates elements visible in the plan views of FIGS. 3F and 3H. A portion of FIG. 5A is marked as portion “L”. FIG. 5B illustrates a detailed view of portion L in a closed (i.e., locked) position. In the closed position, an end of magnet 16 may be facing toward magnetic latch pin 12, thereby attracting magnetic latch pin 12 into a latch groove.

Figure 5C:
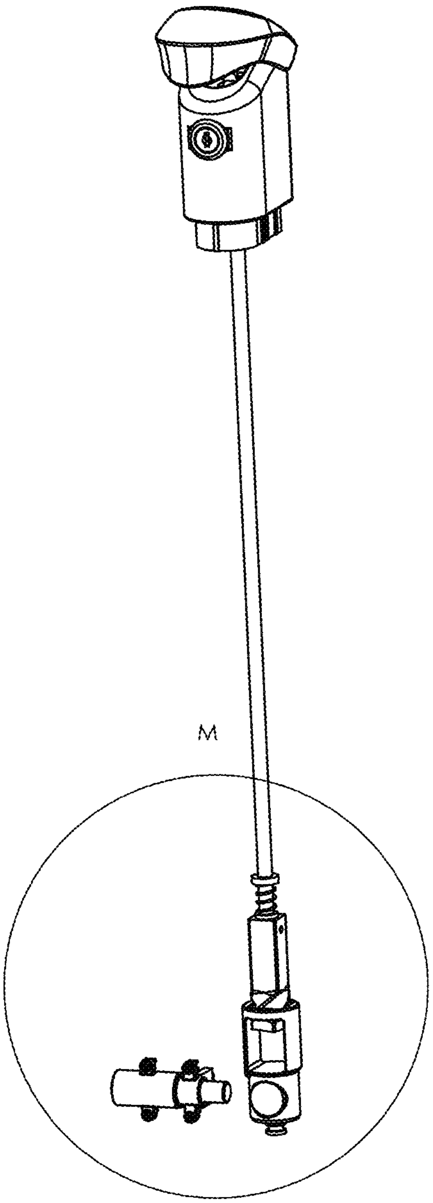
FIG. 5C is an interior front, right and above oblique view of a magnetic safety gate latch system in an open (i.e., unlocked) position, in accordance with an embodiment of the present disclosure.
Figure 5D:
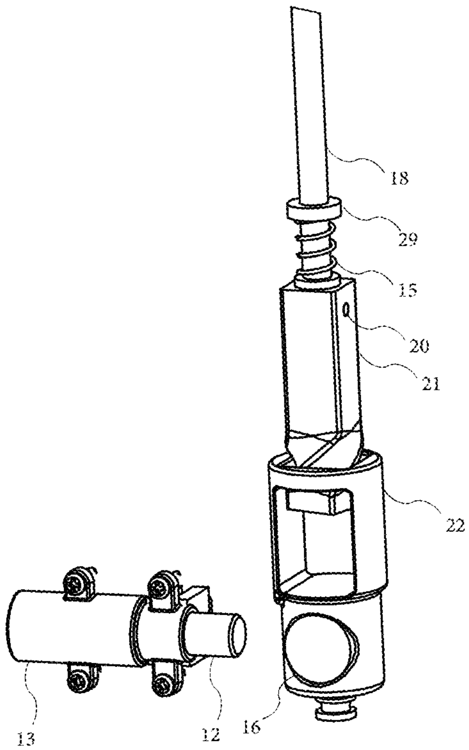
FIG. 5D is a detailed interior front, right and above oblique view of a portion of a magnetic safety gate latch system in an open position, in accordance with an embodiment of the present disclosure.

FIG. 5C illustrates a front, right, and above oblique view of an interior portion of magnetic safety gate latch assembly 100, in accordance with an embodiment of the present disclosure. FIG. 5C illustrates elements visible in the plan views of FIGS. 4F and 4H. A portion of FIG. 5C is marked as portion “M”. FIG. 5D illustrates a detailed view of portion M in an open position. Magnet 16 has been turned 90 degrees compared to the configuration of FIG. 5B. Top lid 5 is lifted in order to put assembly 100 into an open (i.e., unlocked) position by spinning magnet 16 such that magnet 16 disengages with magnetic latch pin 12. In the open position, an end of magnet 16 may be facing away from magnetic latch pin 12, thereby not attracting magnetic latch pin 12 into a latch groove. In other embodiments (not illustrated), if magnetic latch pin 12 is a permanent magnet, magnet 16 may be turned 180 degree, thereby actively repelling magnetic latch pin 12.

Figure 5E:
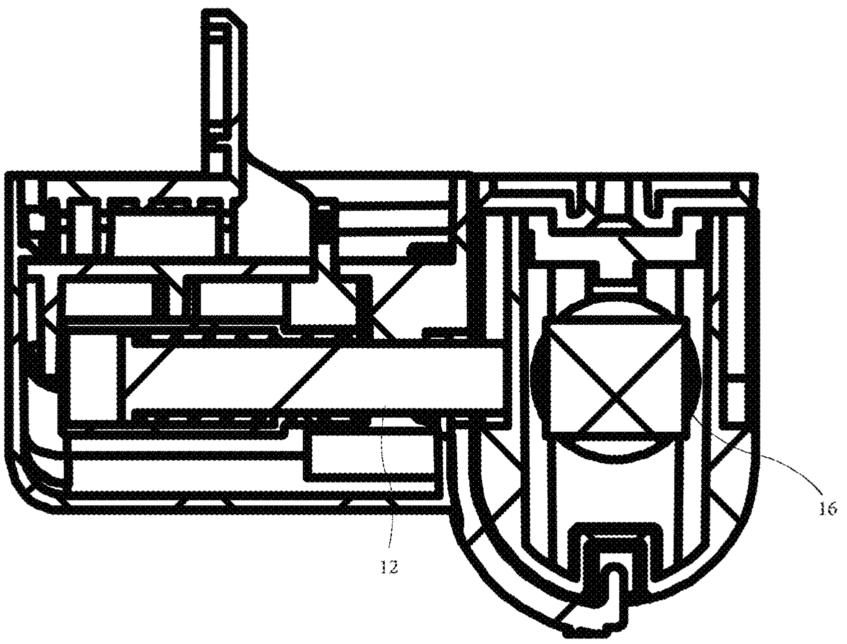
FIG. 5E is a cross-sectional top plan view of a magnetic safety gate latch system in a closed position, in accordance with an embodiment of the present disclosure.

FIG. 5E is a cross-sectional top plan view in a horizontal plane of a magnetic safety gate latch system in a closed position, in accordance with an embodiment of the present disclosure.

Figure 6:
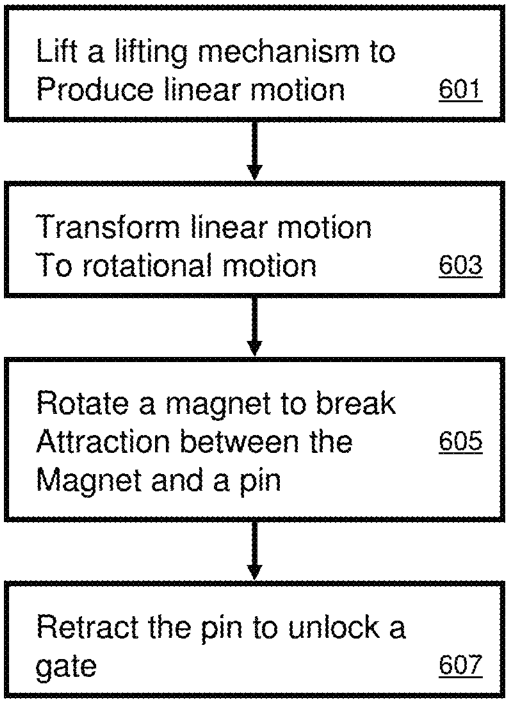
FIG. 6 is a method of operating a magnetic safety gate latch system, in accordance with an embodiment of the present disclosure.

FIG. 6 illustrates a process 600 in accordance with an embodiment of the present disclosure. Process 600 begins with step 601, at which a lifting mechanism such as pool latch lid 5 is lifted in order to produce a linear motion (e.g., in a vertical axis) of a component such as twist drive shaft 18.

Next, process 600 transitions to step 603, at which the linear motion is transformed into a rotational motion, such as a twisting motion of twist drive 21.

Next, process 600 transitions to step 605, at which a magnet (e.g., magnet 16) is rotated by use of the rotational motion, in order to break a magnetic attraction between the magnet and a ferromagnetic pin, e.g., magnetic latch pin 12. Alternatively, step 605 may be described as breaking a magnetic attraction between the magnet and the ferromagnetic pin by rotation of the magnet.

Next, process 600 transitions to step 607, at which the ferromagnetic pin is retracted in order to unlock the gate. For example, a force to retract the pin may be supplied by a spring (e.g., spring 30).

Figure 7A:
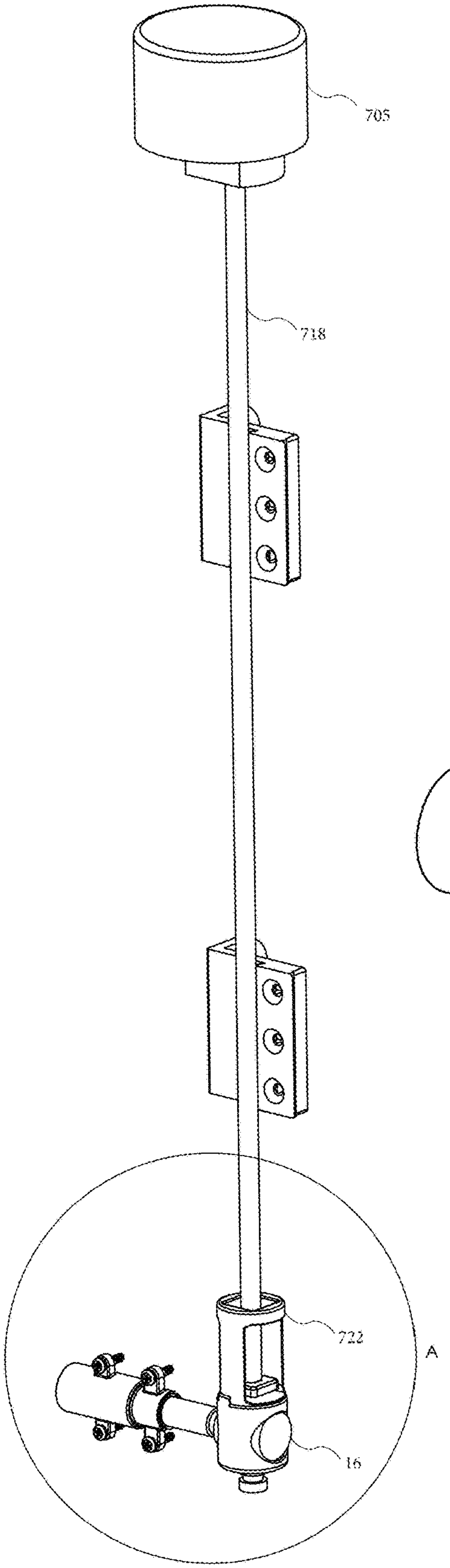
FIG. 7A is an interior front, right and above oblique view of another embodiment of a magnetic safety gate latch system in a closed (i.e., locked) position, in accordance with an embodiment of the present disclosure.
Figure 12:
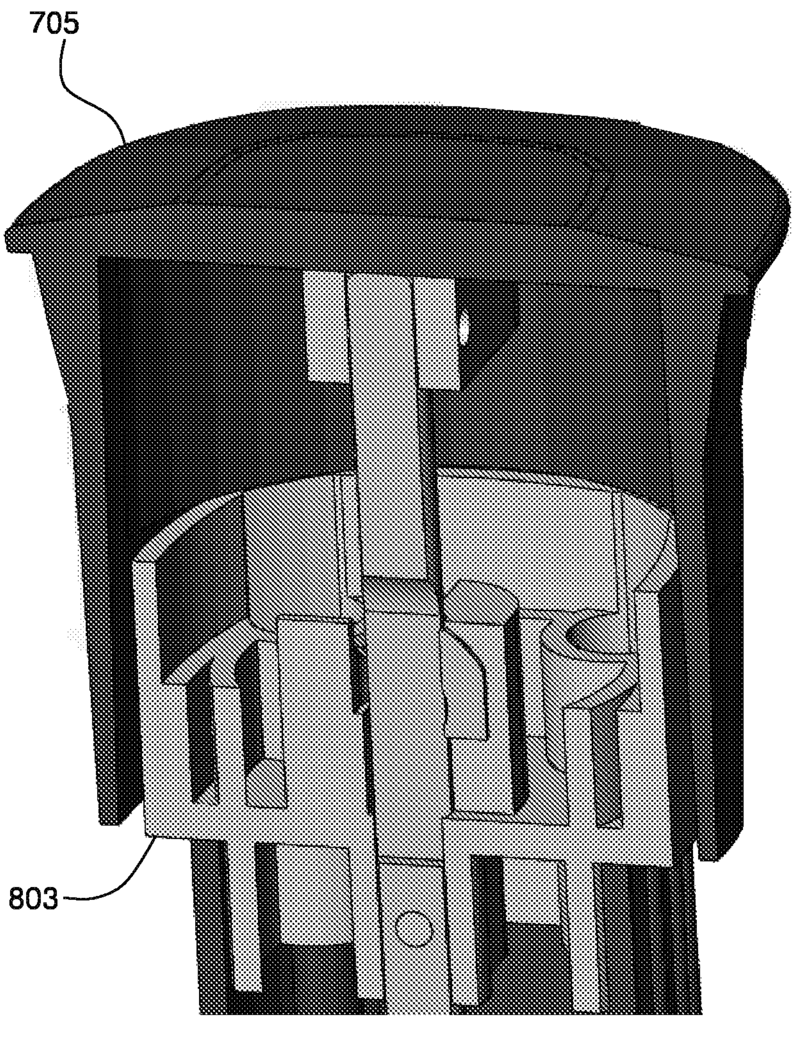
FIG. 12 illustrates a cross-sectional view of a lid loosely coupled to a lock housing by resting on top of lock housing, in accordance with an embodiment of the present invention.

FIG. 7A is an interior front, right and above oblique view of embodiment 700 of a magnetic safety gate latch system in a closed (i.e., locked) position. A lower portion of embodiment 700 is marked as detail “A”, and is shown in greater detail in FIG. 7B. Embodiment 700 may be operable to rotate magnet 16 away from magnetic latch pin 12 in a different way than embodiment 100 of FIG. 1. In contrast to usage of a hinged coupling of lid 5 in embodiment 100 in order to lift up twist drive shaft 18, embodiment 700 rigidly couples lid 705 to a top end of shaft 718. Shaft 718 extends from near a top portion of embodiment 700 to near a lower portion of embodiment 700. Shaft 718 includes a major axis oriented substantially vertically. Shaft 718 is manually rotatable around the major axis, by turning lid 705. Lid 705 may be loosely coupled to pool latch tube 2, e.g., by resting on the top of pool latch tube 2, or on lock housing 803 surrounding lock 802, when lid 705 is not under active manual control. FIG. 12 illustrates a cross-sectional view of lid 705 loosely coupled to lock housing 803 by resting on top of lock housing 803. Lid 705 and lock housing 803 are described below in further detail with respect to FIG. 8A.

Figure 7B:
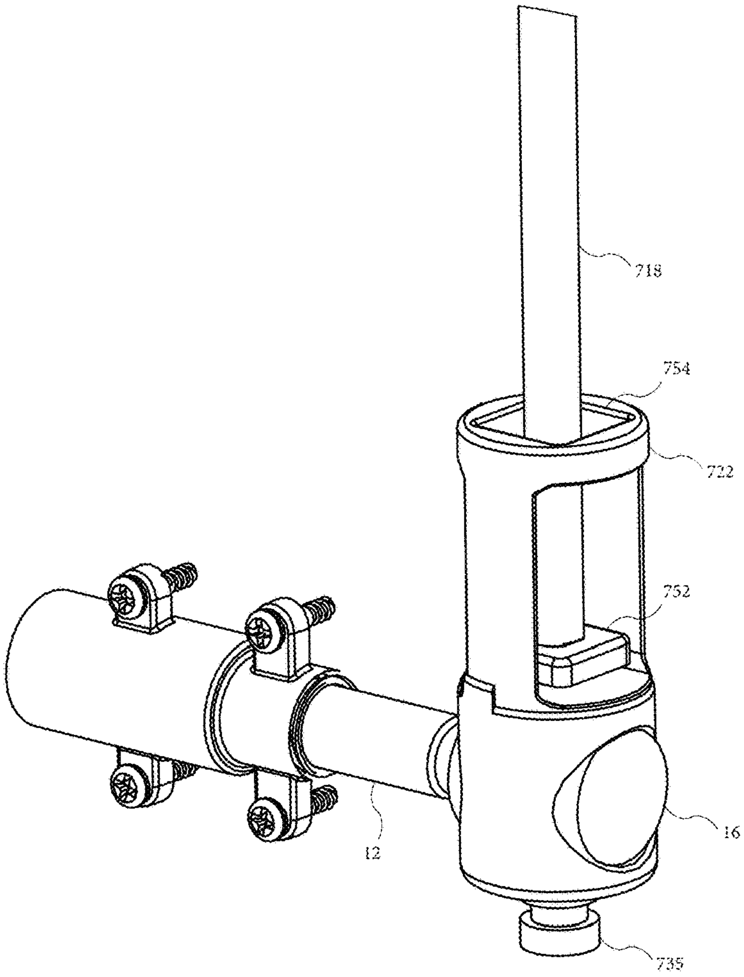
FIG. 7B is a detailed interior front, right and above oblique view of a portion of a magnetic safety gate latch system in a closed position, in accordance with an embodiment of the present disclosure.

A lower end of shaft 718 may be rigidly coupled to a shaped base 752. Shaped base 752 is illustrated in FIGS. 7A and 7B as having a square cross-sectional shape in a plane perpendicular to the major axis of shaft 718. Other cross-sectional shapes of shaped base 752 may be used, such as triangular, hexagonal, toothed, and so forth.

Figure 13:
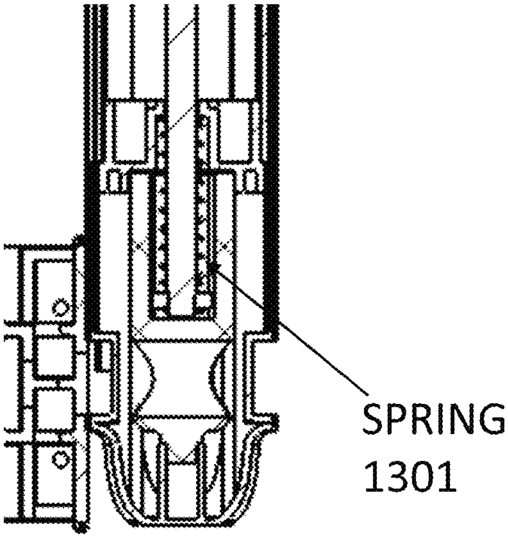
FIG. 13 is a view of a spring used to help keep a magnet housing in a preferred position, in accordance with an embodiment of the present invention.

Shaped base 752 may be loosely coupled to magnet housing 722, which in turn houses magnet 16, when embodiment 700 is in a closed position. The loose coupling allows for shaft 718 to be moved vertically relative to housing 722. The loose coupling may include shaped base 752 merely resting on a cooperating interior surface of magnet housing 722 by force of gravity. In some embodiments as illustrated in FIG. 13, a spring 1301 may be used to help keep magnet housing 722 in a preferred position as shaped base 752 is moved up or down.

An upper wall of magnet housing 722 may include a shaped aperture 754. At least a portion of shaped aperture 754 may include a circumferential edge that is matched to shaped base 752, and may cooperatively engage with shaped base 752 when shaft 718 is lifted up.

FIG. 8A is an interior front, right and above oblique view of embodiment 800 of a magnetic safety gate latch system in an open (i.e., unlocked) position. A lower portion of embodiment 800 is marked as detail “B”, and is shown in greater detail in FIG. 8B. Embodiment 800 illustrates lid 705 having been lifted up or elevated, e.g., by a person attempting to open a gate attached to the safety gate latch system. Lifting of lid 705 in turn lifts shaft 718 coupled to lid 705, and lifts shaped base 752 coupled to shaft 718.

In usage, as lid 705 is lifted (comparing FIG. 8A to FIG. 7A), lid 705 may be rotated around an axis parallel to the major axis of shaft 718, such that shaped base 752 fits at least partially into aperture 754. A vertical mechanical stop may be provided in order to prevent excessive vertical movement that would cause shaped base 752 to pass entirely through aperture 754. For example, the mechanical stop may be a lip along an upper portion of aperture 754, or may be a tapered shape of shaped base 752 (e.g., a truncated pyramid) such that an upper portion of shaped base 752 fits within aperture 754 but not a lower portion, or may be a stop coupled to lid 705 or shaft 718 to prevent excessive vertical movement, and so forth. Fastener 735 prevents magnet housing 722 itself from being lifted up, while still allowing magnet housing 722 to rotate, e.g., fastener 735 may include a ball bearing.

Shaped base 752 may be sized such that it can fit snugly into at least a portion of aperture 754 without excessive "play". Play facilitates fitting shaped base 752 into aperture 754, but excessive play may risk causing a user to perceive embodiment 800 as being poorly designed or manufactured. For example, a play of less than +/−5 degrees of rotation of lid 705 around a vertical axis may be deemed to be acceptable.

Aperture 754 may have a circular shape if shaped base 752 has a shape of a truncated cone. Such an embodiment may not need play. However, a circular aperture 754 without additional surface features to increase a mechanical engagement of circular aperture 754 with shaped base 752 would be less desirable since it would rely upon friction to rotate magnet housing 722 when shaft 718 rotates. In order to increase the engagement of base 752 with magnet housing 722 and help prevent slippage for a circular aperture 754, cooperating surfaces of base 752 with magnet housing 722 may include matching or interlocking non-smooth surface features (e.g., similar to a bevel gear). In contrast, non-circular shapes of aperture 754 and shaped base 752 substantially always employ a positive engagement between them in order to rotate magnet housing 722 when shaft 718 rotates.

In other embodiments, aperture 754 may be only large enough to allow shaft 718 to pass through an upper wall of magnet housing 722. In this embodiment, aperture 754 may have a circular shape. The upper wall may include ridges, tabs or the like on a surface facing shaped base 752. Shaped base 752 then may include cooperating ridges, slots, or the like on a surface facing the upper wall of magnet housing 722. Engagement of shaped base 752 with magnet housing 722 would then be via the respective cooperating ridges or the like, rather than through respective cooperating circumferential surfaces.

Once shaped base 752 fits into or couples with aperture 754, lid 705 may be rotated approximately +/−90 degrees, while keeping lid 705 in an elevated position. Doing so will cause magnet housing 722 to rotate by about the same amount (to within an angular tolerance determined by the play), and cause magnetic latch pin 12 to disengage from magnet 16, and thus unlock the gate. A rotational mechanical stop may be provided to limit rotation of lid 705 to within about +/−90 degrees. When locking the gate from an unlocked state, these steps may be repeated with the exception of rotating lid 705 in an opposite direction. Other angular rotations also may be used (e.g., 45 degrees), so long as in a rotated position the magnetic attraction force between magnetic latch pin 12 and magnet 16 is sufficiently attenuated to be unable to overcome the repulsive force of spring 30.

In some embodiments, an optional lock 802 may be provided. Lock 802 may prevent the gate from being locked or unlocked except by an authorized person. In some embodiments, lock 802 may be exposed only when lid 705 is at least partially lifted up. When locked, lock 802 may operate by, e.g., preventing rotation of shaft 718, or preventing sufficient vertical motion of lid 705 to cause shaped base 752 to couple with aperture 754 and/or the upper wall of magnet housing 722. Lock 802 may be at least partially encircled and held in place by lock housing 803.

Figure 9:
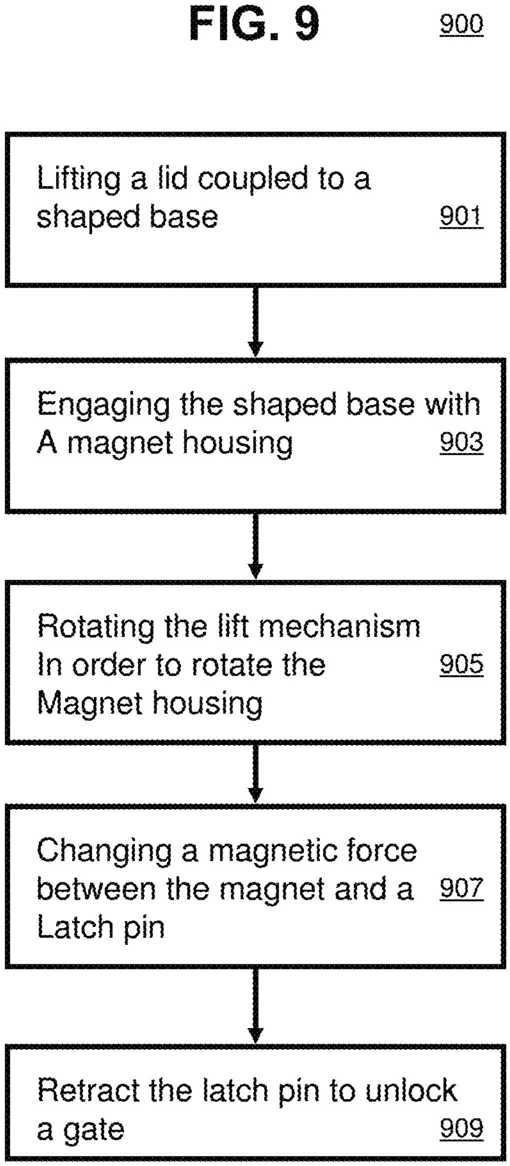
FIG. 9 is a method of operating a magnetic safety gate latch system, in accordance with another embodiment of the present disclosure.

FIG. 9 illustrates a method 900 to operate a magnetic safety gate latch assembly of FIG. 7A-7B or 8A-8B, in accordance with an embodiment of the present invention. Method 900 begins at step 901, at which a lid (e.g., lid 705) rigidly coupled to a shaped base (e.g., shaped base 752) is lifted, e.g., lifted by a person wishing to unlock the assembly.

Next, at step 903, once the shaped base is lifted by a sufficient amount, the shaped base engages with a magnet housing (e.g., magnet housing 722). The nature of the engagement is such that a rotation of one (e.g., the shaped base) causes the other (e.g., the magnet housing) also to rotate. For example, the engagement may be a result of a physical feature of the shaped base (e.g., a circumferential shape, a surface knurling, etc.) mating with a complementary physical feature of the magnet housing (e.g., a circumferential shape of a matching aperture, a knurling on the surface of the magnet housing, etc.).

Next, at step 905, the lift mechanism is rotated in order to rotate the magnet housing.

Next, at step 907, once the magnet housing has been rotated by more than a threshold amount, a magnetic force between a magnet (e.g., magnet 16) in the magnet housing and a ferromagnetic latch pin (e.g., magnetic latch pin 12) is changed. For example, an attractive magnetic force between the magnet and the ferromagnetic latch pin may be lessened sufficiently to allow the magnetic latch pin to retract away from the magnet 16 under the force of a spring. Conversely, if the magnetic latch pin itself is a latch pin magnet that is oriented normally to be pushed toward (or be attracted to) the magnet housing, then rotating the housing may cause a repulsive magnetic force from the magnet in the magnet housing to repel the latch pin magnet.

Next, at step 909, a balance of magnet force and spring force causes the ferromagnetic latch pin to retract, in order to unlock the magnetic safety latch assembly.

Though the above embodiments are described with reference to a fence gate system and assembly, embodiments of the present disclosure are intended to cover any fence assembly having one or more uprights.

Figure 10A:
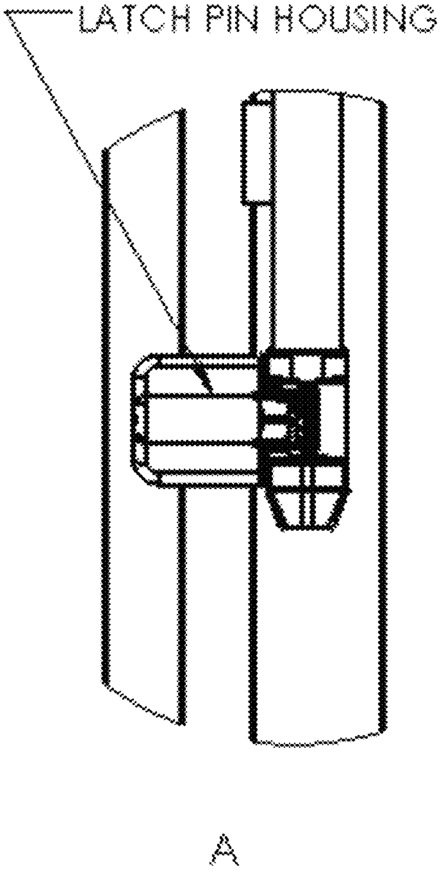
FIGS. 10A, 10B are front and side plan views, respectively, of a lower portion of a gate assembly in a correct alignment.
Figure 10B:
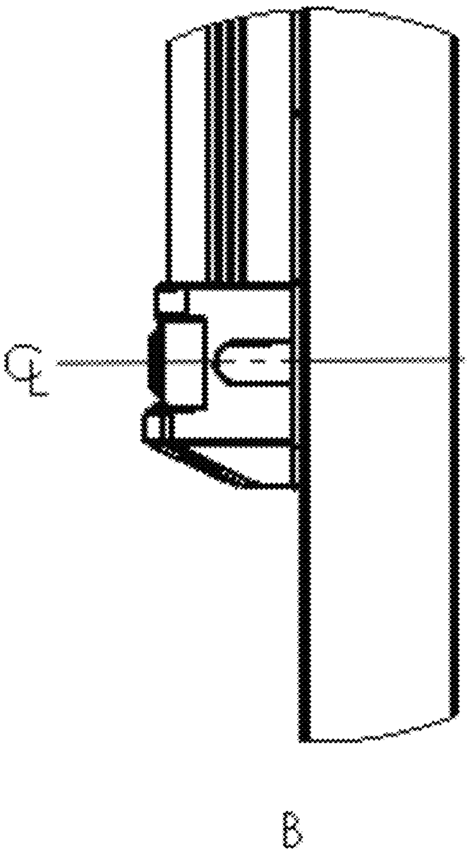
Figure 10C:
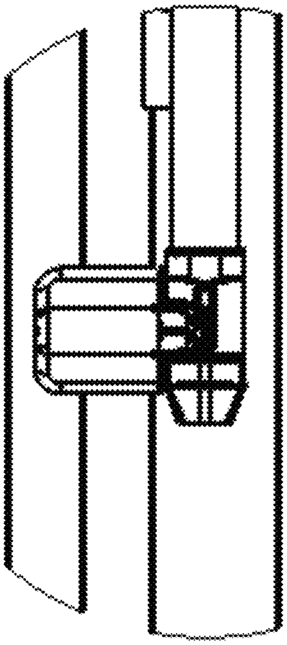
FIG. 10C, 10D are front and side plan views, respectively, of a lower portion of a gate assembly in a sagged mis-alignment.
Figure 10D:
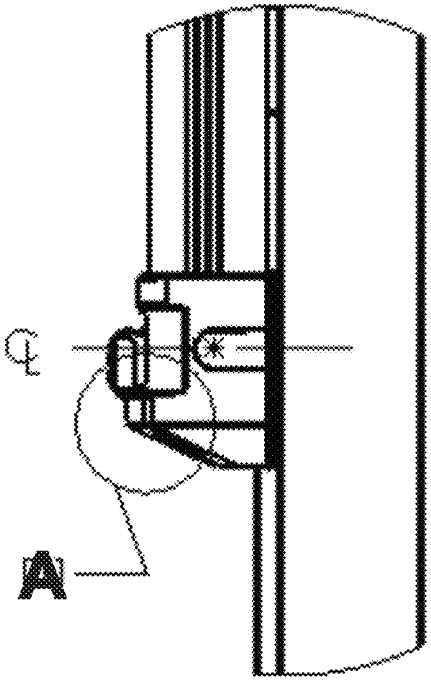
Figure 10E:
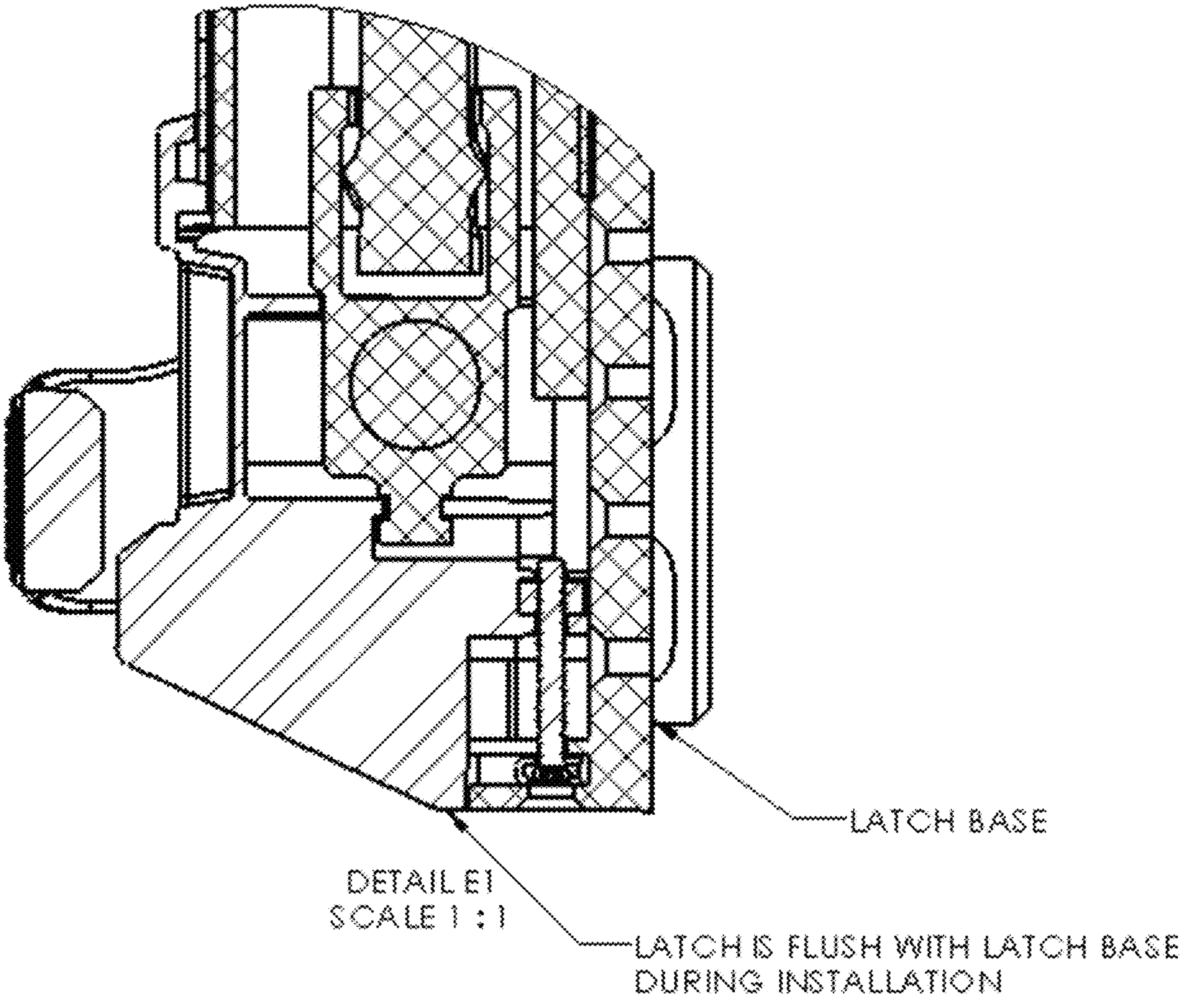
FIG. 10E is a side cross-sectional view of a lower portion of a gate assembly in a highly sagged mis-alignment.

When a gate assembly (e.g., latch assembly 100) is correctly installed, the gate and latch pin housing will be centered as shown in FIG. 10A and FIG. 10B. However, over time the gate may sag and the latch pin housing (or latch pin guide 13) may be below a center position of latch groove 50 in bottom cover 10, as shown in FIG. 10C and FIG. 10D, which without correction or adjustment could result in the gate being difficult to latch, or may require a user to lift up manually on the gate in order to close the gate. Without adjustment of the gate or latch pin housing, the gate will continue to sag to a position shown in FIG. 10E, and eventually the gate may not close at all without a lifting effort by the user. Such a lifting effort is not desirable because it prevents the gate from being self-closing, self-latching and/or self-locking, which is important to maintain safety around swimming pools or other attractive nuisance. Self-closing, self-latching and/or self-locking helps prevent unsupervised ingress to, or egress from, a monitored area such as a swimming pool area.

The problem described with respect to FIGS. 10A-10E may be addressed by adding chamfers or the like to one or both of the latch pin cover and the bottom cover, in order to allow the gate still to be closed, latched and/or locked even when below center. The area where the chamfers are added is highlighted as detail "A" in FIG. 10D, and detail "A" is illustrated in greater detail below with respect to FIGS. 11A and 11F.

Figure 11A:
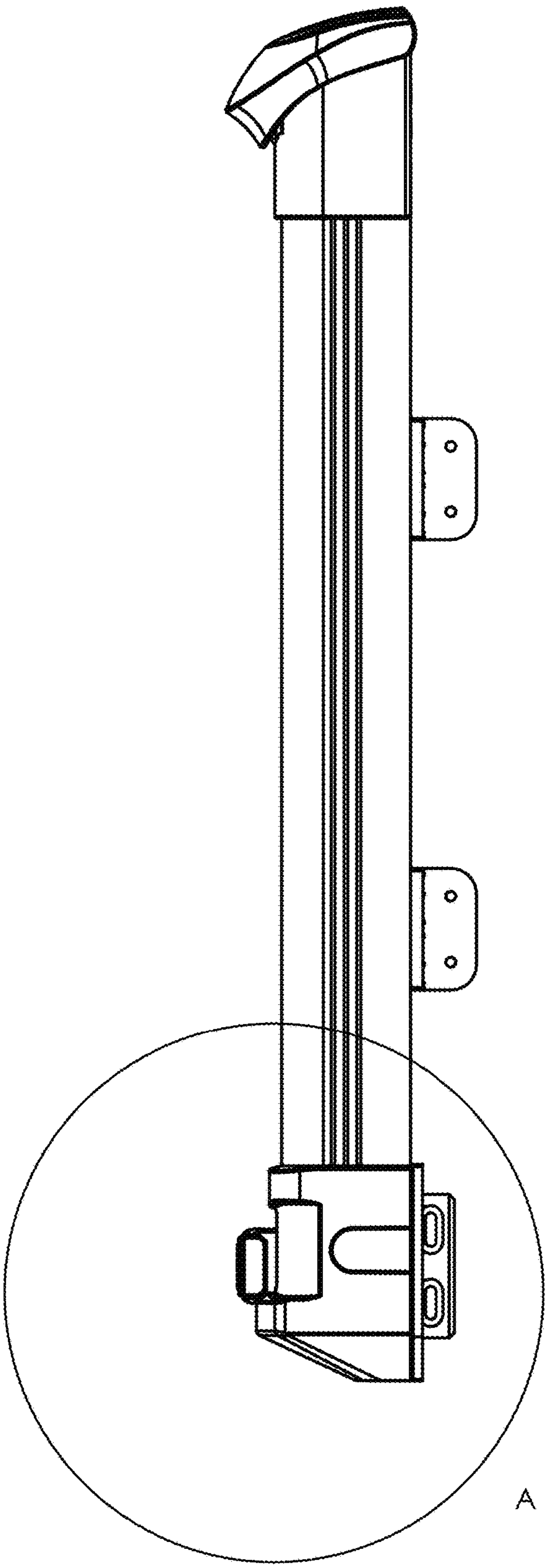
FIG. 11A is an exterior right plan view of a magnetic safety gate latch system in a misaligned position, in accordance with an embodiment of the present disclosure.
Figure 11B:
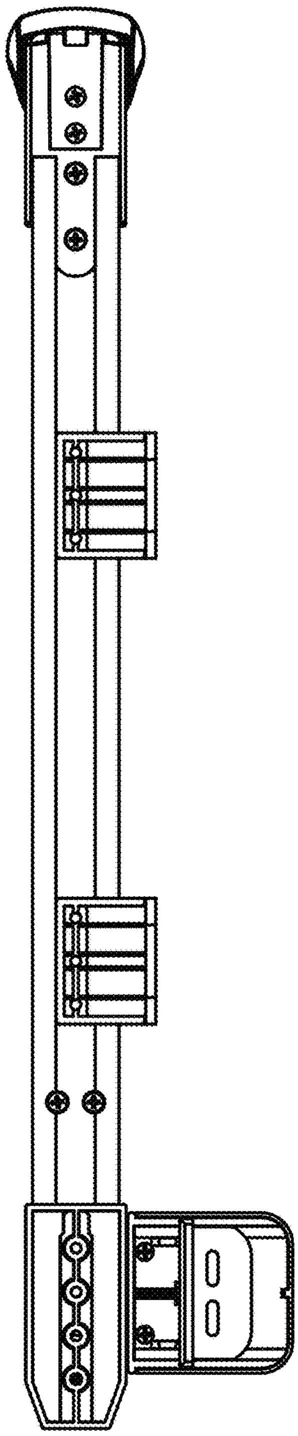
FIG. 11B is an exterior rear plan view of a magnetic safety gate latch system in an aligned position, in accordance with an embodiment of the present disclosure.

FIG. 11A is an exterior right plan view of a magnetic safety gate latch system in a misaligned position, with a portion marked as area "A", while FIG. 11B is an exterior rear plan view of a magnetic safety gate latch system in an aligned position.

Figure 11C:
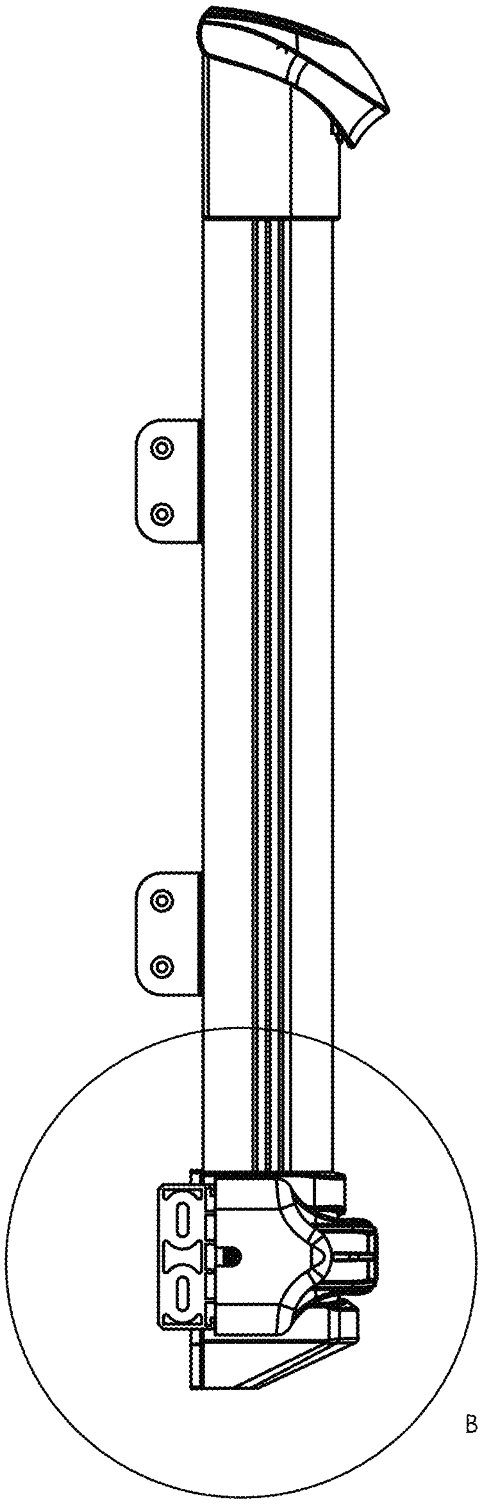
FIG. 11C is an exterior left plan view of a magnetic safety gate latch system in an aligned position, in accordance with an embodiment of the present disclosure.
Figure 11D:
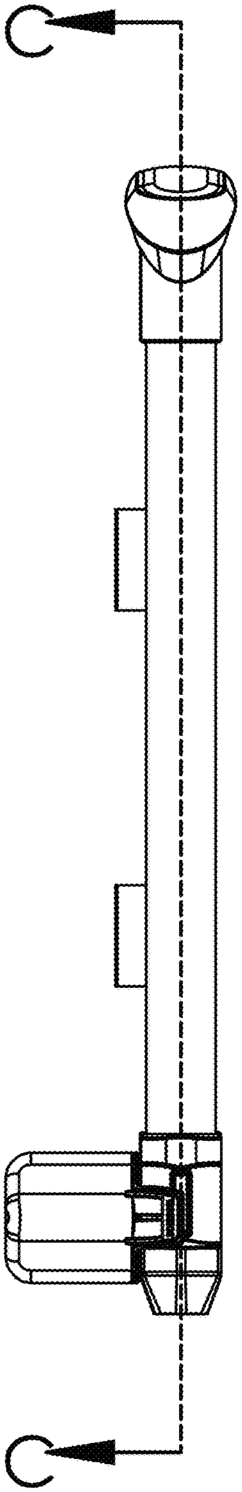
FIG. 11D is an exterior front plan view of a magnetic safety gate latch system in a misaligned position, marked with cut plane C-C, in accordance with an embodiment of the present disclosure.
Figure 11E:
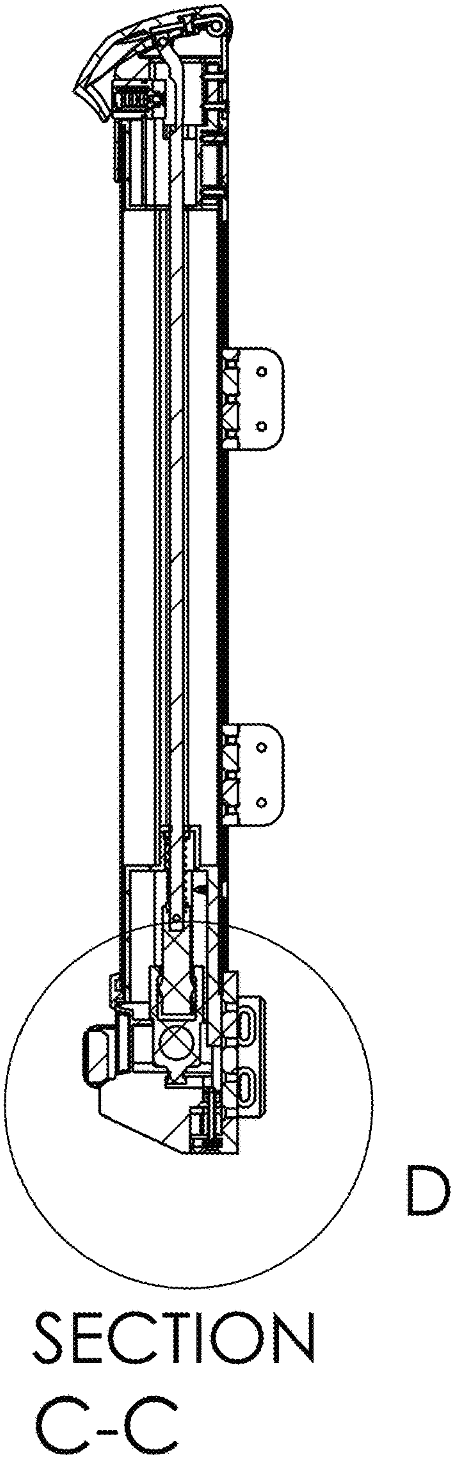
FIG. 11E is a cross-sectional right plan view in cut plane C-C of a magnetic safety gate latch system in a mis-aligned position, in accordance with an embodiment of the present disclosure.
Figure 11F:
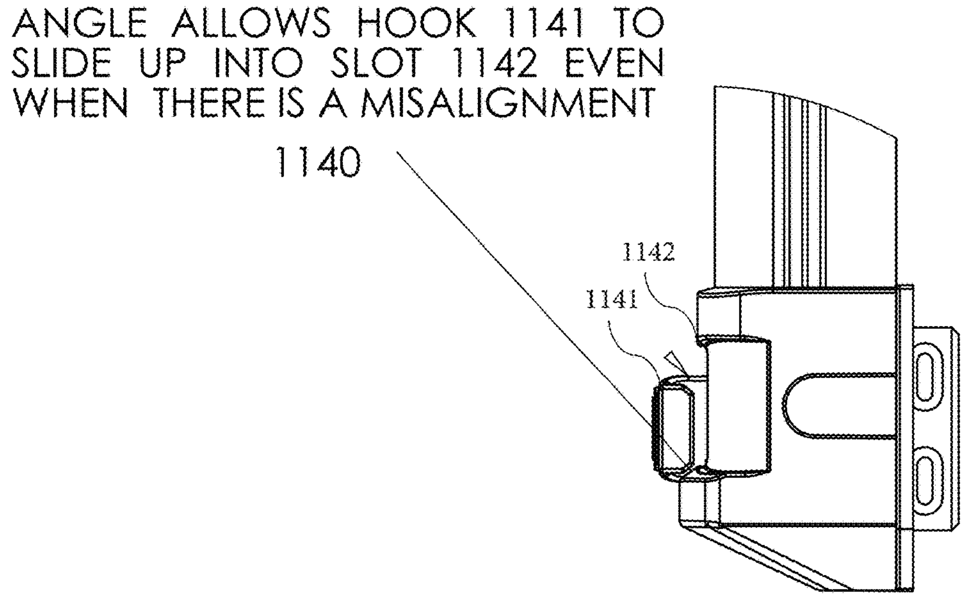
FIG. 11F is a view of Detail A, which is shown in context in FIG. 11A.

Area "A" is shown in greater detail in FIG. 11F as Detail A. Detail A illustrates a chamfered surface 1140, which is angled with respect to a direction of travel of a gate when it is closed. In particular, as the gate is closed, chamfered surface 1140 allows hook 1141 to slide up chamfered surface 1140 so that hook 1141 can go into slot 1142.

Figure 11G:
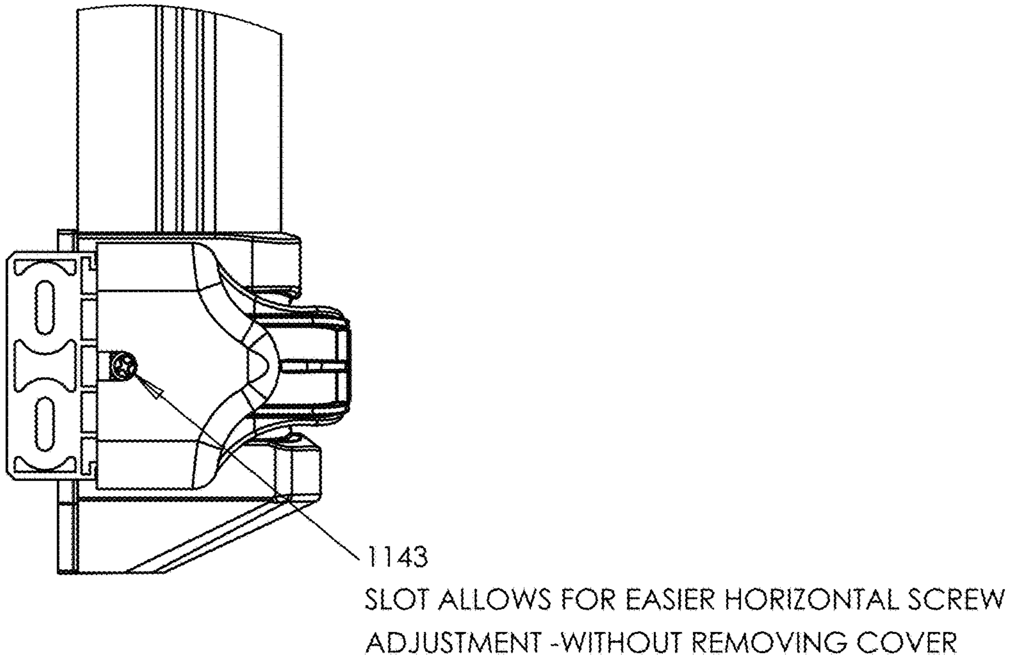
FIG. 11G is a view of Detail B, which is shown in context in FIG. 11C.

FIG. 11C is an exterior left plan view of a magnetic safety gate latch system in an aligned position, with a portion marked as area "B". Area "B" is shown in greater detail in FIG. 11G as Detail B. As illustrated in FIG. 11G, a slot 1143 may be provided in order to allow for easier access to a screw control for horizontal adjustment, without a need to remove a post cover (e.g., pool latch tube bottom cover 10).

FIG. 11D is an exterior front plan view of a magnetic safety gate latch system in a misaligned position, marked with cut plane C-C, and FIG. 11E is a cross-sectional right plan view in cut plane C-C of a magnetic safety gate latch system in a mis-aligned position, with a portion marked as area "D".

Figure 11H:
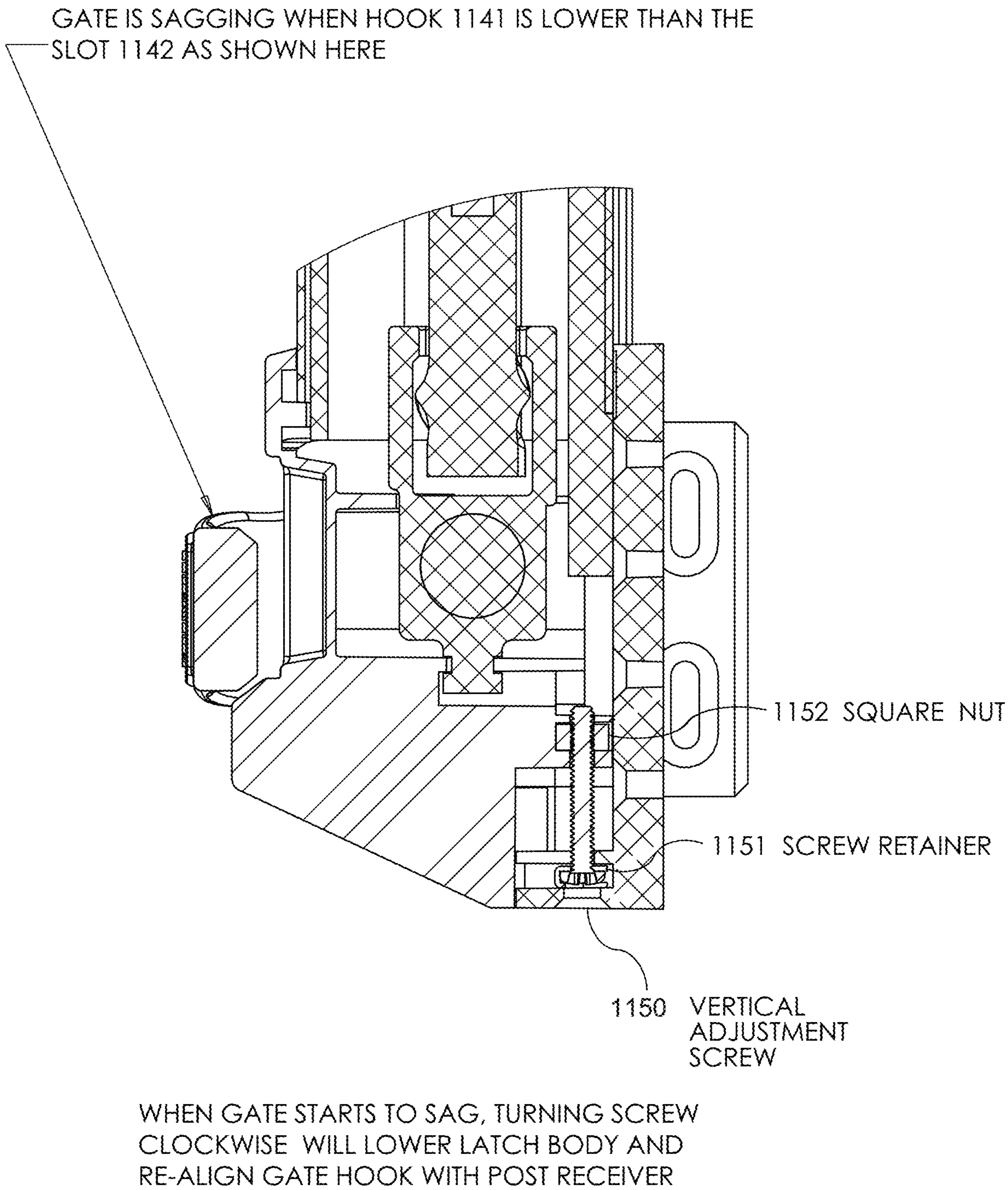
FIG. 11H is a view of Detail D, which is shown in context in FIG. 11E.

Area "D" is shown in greater detail in FIG. 11H as Detail D. As illustrated, the gate is sagging, as evidenced by hook 1141 being lower than slot 1142. This assumes the post to which magnet housing 22 is coupled to is itself relatively stable and not sagging, compared to the gate. However, if the post is susceptible to settling or sagging over time, such that a misalignment of hook 1141 and slot 1142 may occur in other directions than that depicted in FIG. 11H, then additional chamfered surfaces may be provided around more of the circumference of hook 1141 and/or slot 1142.

FIG. 11H illustrates addition of a vertical adjustment screw 1150, used to adjust a vertical positioning of the latch body housing formed by lock pin base cover 11 and pool latch cover 14, relative to base bracket 17. Vertical adjustment screw 1150 operates together with screw retainer 1151 and square nut 1152. In operation, if the gate begins to sag, turning screw 1150 (e.g., clockwise) will lower the latch body housing will lower the latch body housing and re-align gate hook 1141 with receiving post slot 1142.

Figure 11I:
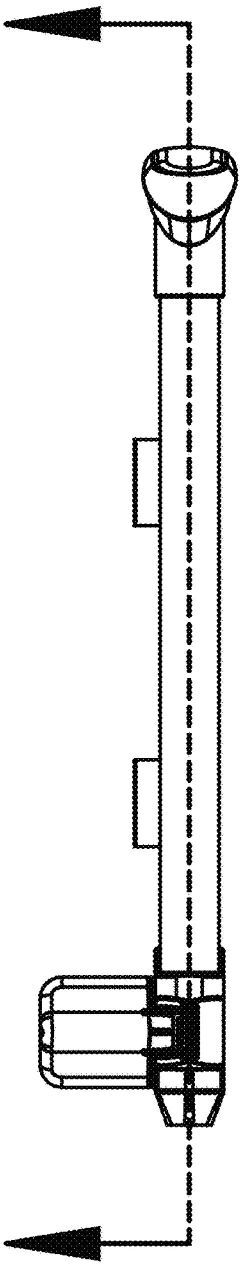
FIG. 11I is an exterior front plan view of a magnetic safety gate latch system in an aligned position, marked with cut plane E-E, in accordance with an embodiment of the present disclosure.
Figure 11J:
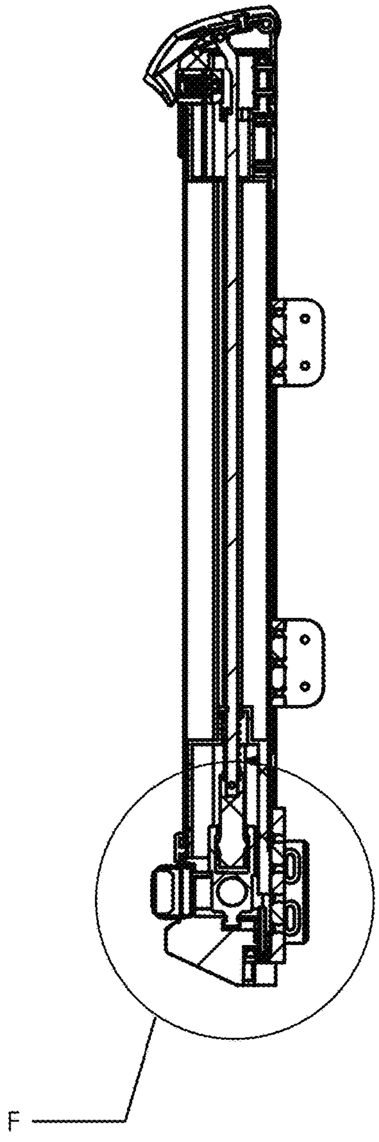
FIG. 11J is a cross-sectional right plan view in cut plane E-E of a magnetic safety gate latch system in an aligned position, in accordance with an embodiment of the present disclosure.

FIG. 11I is an exterior front plan view of a magnetic safety gate latch system in an aligned position, marked with cut plane E-E, and FIG. 11J is a cross-sectional right plan view in cut plane E-E of the magnetic safety gate latch system in an aligned position, with a portion marked as area "F". Area "F" is shown in greater detail in the cross-sectional view of FIG. 11L. FIG. 11L illustrates positioning of the latch body housing after vertical adjustment screw 1150 had been used to restore alignment of hook 1141 with receiving post slot 1142. In some embodiments, up to about 0.5 inches of adjustment end-to-end may be provided by turning vertical adjustment screw 1150 by a full amount.

Figure 11K:
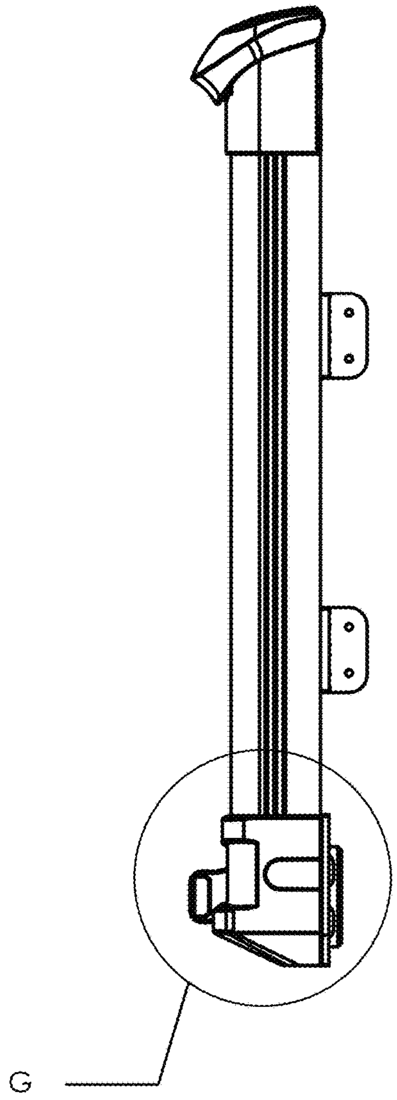
FIG. 11K is an exterior right plan view of a magnetic safety gate latch system in a misaligned position, in accordance with an embodiment of the present disclosure.
Figure 11L:
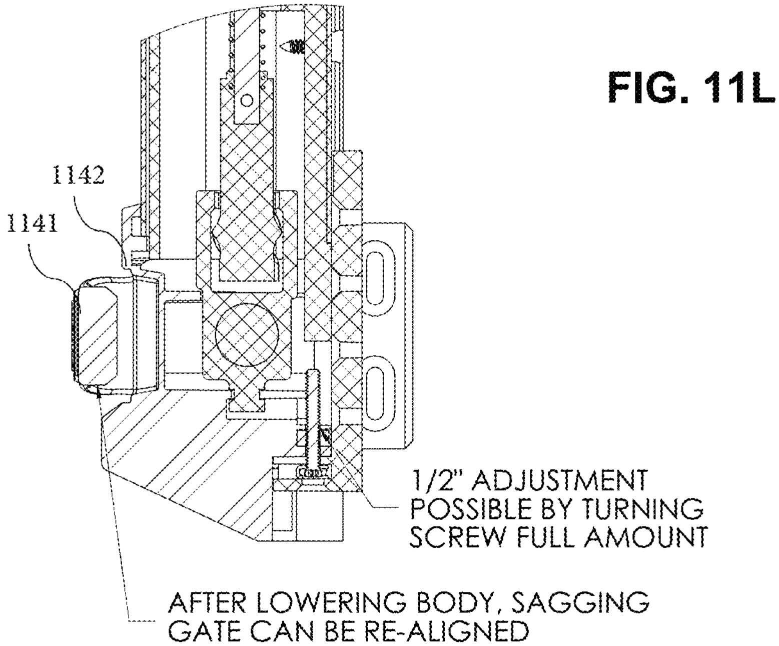
FIG. 11L is a view of Detail F, which is shown in context in FIG. 11J.
Figure 11M:
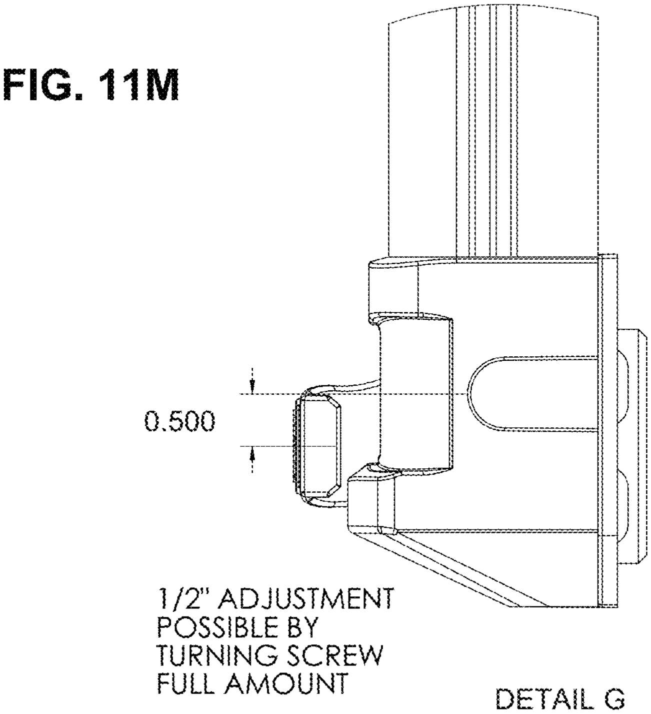
FIG. 11M is a view of Detail G, which is shown in context in FIG. 11K.

FIG. 11K is an exterior right plan view of a magnetic safety gate latch system in a misaligned position, with a portion marked as area "G". Area "G" is shown in greater detail in FIG. 11M. The view of FIG. 11M is from an external view, but is otherwise similar to the cross-sectional view of FIG. 11L.

Vertical adjustment screw 1150 can be turned with a screwdriver, with a result as shown in Detail F in FIG. 11L. This adjustment will lower the latch body on the post and allow latch pin 12 on the gate to be centered with latch groove 50 on the post. This is an easier adjustment than an alternative adjustment of centering by moving the latch pin housing higher on the gate or removing the latch body on the post and lowering the latch base.

Figure 15A:
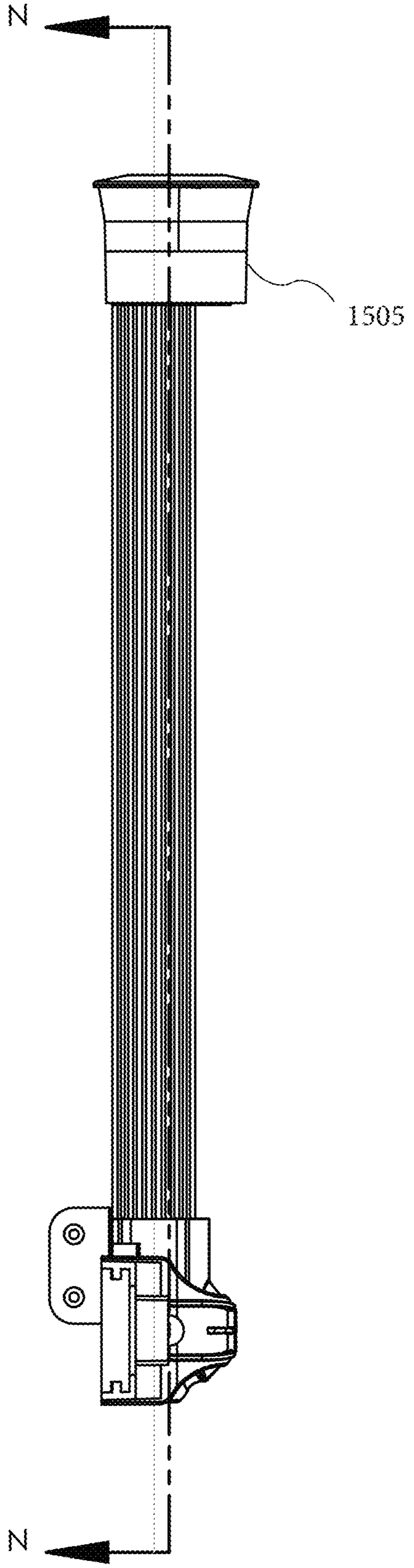
FIG. 15A is an exterior left plan view of a magnetic safety gate latch system shown in detail in FIG. 13, in accordance with an embodiment of the present invention.

FIG. 15A is an exterior left plan view of a magnetic safety gate latch system shown in detail in FIG. 13, and is marked with cut plane N-N. The system of FIG. 15A includes a lid 1505 similar to lid 705 shown in FIG. 7A.

Figure 15B:
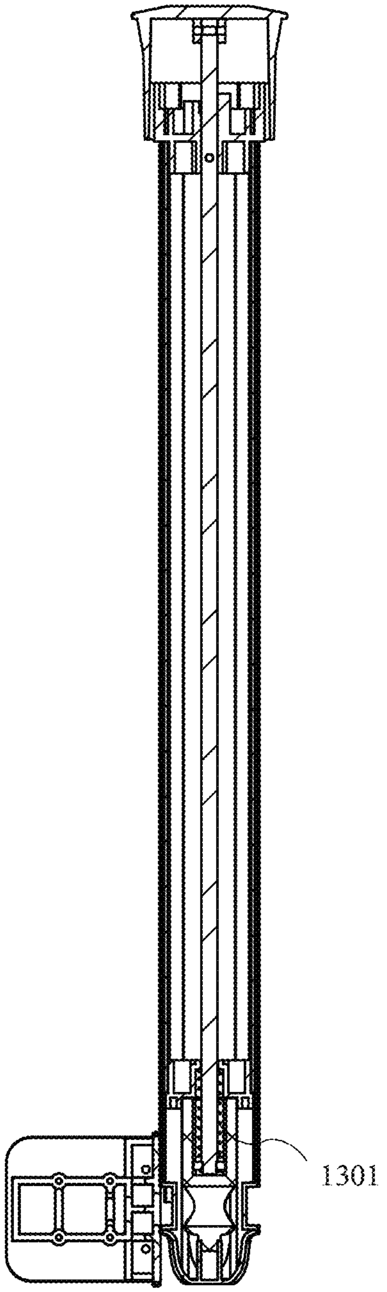
FIG. 15B is a cross-sectional front plan view in cut plane N-N of the magnetic safety gate latch system of FIG. 15A, in accordance with an embodiment of the present invention.

FIG. 15B is a cross-sectional front plan view in cut plane N-N of a magnetic safety gate latch system. FIG. 15B includes an illustration of spring 1301, shown in greater detail in FIG. 13.

Figure 16A:
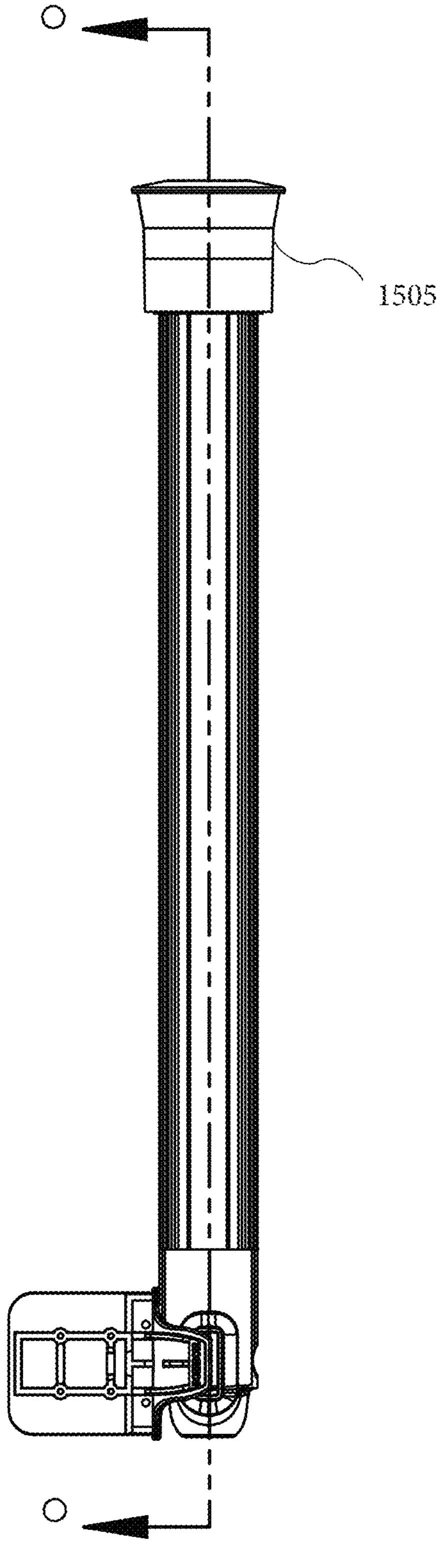
FIG. 16A is an exterior front plan view of the magnetic safety gate latch system shown in FIG. 15A, in accordance with an embodiment of the present invention.

FIG. 16A is an exterior front plan view of the magnetic safety gate latch system shown in FIG. 15A, and which is shown in detail in FIG. 13. FIG. 16A is marked with cut plane O-O.

Figure 16B:
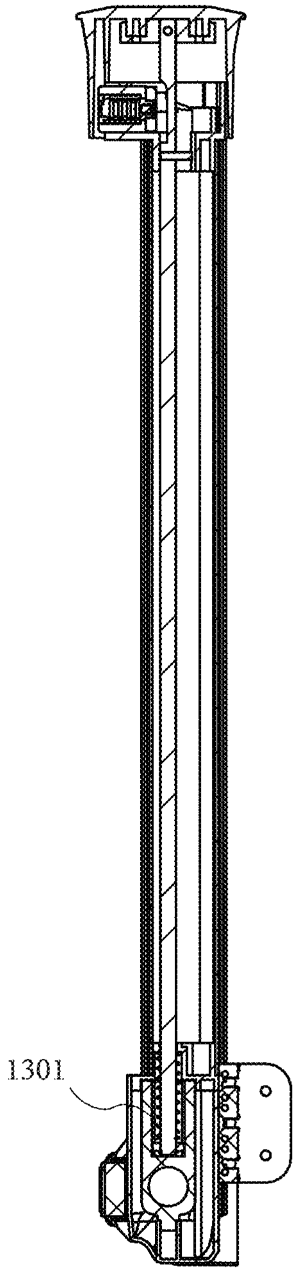
FIG. 16B is a cross-sectional right plan view in cut plane O—O of the magnetic safety gate latch system shown in FIG. 16A, in accordance with an embodiment of the present invention.

FIG. 16B is a cross-sectional right plan view in cut plane O-O of the magnetic safety gate latch system shown in FIG. 16A.

Although the present invention has been described with reference to exemplary embodiments, it is not limited thereto. Changes and modifications may be made to the preferred embodiments of the present invention and such changes and modifications may be made without departing from the spirit of the present invention. The claims are intended to cover all such equivalent variations as fall within the spirit and scope of the present invention.

To avoid unnecessarily obscuring the present invention, the preceding description omits well known structures and devices. These omissions are not to be construed as a limitation of the scope of the present invention. Specific details are set forth by use of the embodiments to provide an understanding of the present invention. However, the present invention may be practiced in a variety of ways beyond the specific embodiments set forth herein.

A number of embodiments of the present invention may be practiced. It is possible to provide for some features of the present invention without providing for others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing detailed description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above.

This method of disclosure is not to be interpreted as reflecting an intention the present invention requires more features than are recited expressly in each claim. Rather, as the following claims reflect, inventive aspects lie in less than all features of a single foregoing disclosed embodiment, configuration, or aspect. Thus, the following claims are hereby incorporated into this detailed description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure, without intending to publicly dedicate any patentable subject matter.

What is claimed is:

1. A system comprising:

a top assembly comprising:

a pool latch tube that includes a top insert to couple and stabilize the pool latch tube to a tube cover;

a pool latch lid configured above the pool latch tube, wherein the pool latch lid is part of a lift mechanism, and wherein the pool latch lid is rotationally coupled to the tube cover; and a hinge base configured underneath the pool latch lid, wherein the hinge base is coupled to the pool latch lid and to a top end of twist drive shaft, wherein the twist drive shaft is spring loaded to a resting position;

a bottom assembly configured below the top assembly, the bottom assembly comprising:

a latch member housing that houses a latch member, wherein the twist drive shaft is configured to cause the latch member housing to rotate between a first position and a second position;

a bottom cover that faces a housing formed from a base cover and a latch cover;

a latch pin configured within the housing, wherein the latch pin is aligned with one or more apertures in the housing;

a spring configured to interact with the latch pin; and one or more latch grooves positioned in the bottom cover, wherein when the latch member housing is in the first position, the latch member is configured to permit the latch pin to partially pass through an opening of the one or more latch grooves, and wherein when the latch member housing is in the second position, the latch pin is retracted by the spring to move back into the housing.

2. The system of claim 1, wherein the pool latch tube provides a force or mechanism to a gate lock mechanism.

3. The system of claim 1, wherein the twist drive shaft is pulled into the resting position.

4. The system of claim 1, wherein the latch pin is configured within the one or more latch grooves to provide a locking mechanism for one or more gates.

5. The system of claim 1, further comprising:

a latch bracket connected to the pool latch tube on a post side of a fence structure.

6. The system of claim 1, wherein the top insert has a smaller cross-sectional size in comparison to the pool latch tube and tube cover.

7. The system of claim 1, further comprising:

a pool latch hinge pin that forms an axis of rotation for the pool latch lid.

8. The system of claim 1, further comprising:

one or more fasteners to secure the bottom cover to a pool latch base.

9. The system of claim 1, further comprising:

a bottom insert positioned within the pool latch tube to couple the bottom cover to the pool latch tube.

10. The system of claim 1, wherein the twist drive shaft provides a connection to a gate locking mechanism at a bottom end of the pool latch tube.

11. The system of claim 1, further comprising:

a latch lock assembly configured behind the pool latch lid.

12. The system of claim 1, wherein the one or more latch grooves are formed in vertical sides of the bottom cover.

13. The system of claim 1, wherein a diameter of the one or more latch grooves is greater than a diameter of the latch pin.

* * * * *